United States Patent
Kammerzell

(10) Patent No.: US 7,510,174 B2
(45) Date of Patent: Mar. 31, 2009

(54) DEW POINT COOLING TOWER, ADHESIVE BONDED HEAT EXCHANGER, AND OTHER HEAT TRANSFER APPARATUS

(76) Inventor: Larry L. Kammerzell, 1725 E. Broadway, Phoenix, AZ (US) 85040

( * ) Notice: Subject to any disclaimer, the term of this patent is extended or adjusted under 35 U.S.C. 154(b) by 369 days.

(21) Appl. No.: 11/404,950

(22) Filed: Apr. 14, 2006

(65) Prior Publication Data
US 2007/0241468 A1 Oct. 18, 2007

(51) Int. Cl.
*B01F 3/04* (2006.01)
(52) U.S. Cl. .................. 261/153; 261/DIG. 11; 165/166; 165/900
(58) Field of Classification Search ............... 261/97, 261/153, DIG. 11; 62/99, 304, 310, 314; 165/166, 900
See application file for complete search history.

(56) References Cited

U.S. PATENT DOCUMENTS

| | | | |
|---|---|---|---|
| 3,929,537 A * | 12/1975 | Erwin | ............ 156/86 |
| 3,987,845 A | 10/1976 | Potthoff et al. | |
| 3,994,999 A | 11/1976 | Phelps | |
| 4,156,351 A | 5/1979 | Schlom et al. | |
| 4,227,572 A | 10/1980 | Harlan | |
| 4,269,796 A | 5/1981 | Glicksman et al. | |
| 4,300,629 A | 11/1981 | Hatada et al. | |
| 4,315,873 A | 2/1982 | Smith et al. | |
| 4,361,184 A | 11/1982 | Bengtsson | |
| 5,301,518 A | 4/1994 | Morozov et al. | |
| 5,600,960 A * | 2/1997 | Schwedler et al. | ............ 62/99 |
| 5,709,264 A | 1/1998 | Sweeney et al. | |
| 5,832,992 A * | 11/1998 | Van Andel | ............ 165/165 |
| 5,944,094 A | 8/1999 | Kinney, Jr. et al. | |
| 6,338,258 B1 | 1/2002 | Lee et al. | |
| 6,591,620 B2 * | 7/2003 | Kikuchi et al. | ............ 62/126 |
| 6,672,375 B1 | 1/2004 | Shippy et al. | |
| 6,845,629 B1 | 1/2005 | Bourne et al. | |
| 6,854,278 B2 | 2/2005 | Maisotsenko et al. | |
| 6,928,833 B2 | 8/2005 | Watanabe et al. | |
| 6,942,024 B2 | 9/2005 | Nies | |

\* cited by examiner

*Primary Examiner*—Scott Bushey
(74) *Attorney, Agent, or Firm*—Cahill, von Hellens & Glazer PLC

(57) ABSTRACT

A dew point cooling tower system utilizes cooled water produced by the system to reduces the wet bulb temperature of ambient air before the ambient air is directed through fill in the cooling tower. One preferred heat exchanger utilized in the cooling tower is an air-to-liquid heat exchanger including a plurality of spaced apart plate units each having a pair of adhesively bonded spaced apart plates having a liquid flow channel formed intermediate the adhesively bonded plates.

2 Claims, 14 Drawing Sheets

CROSS-FLOW HEAT EXCHANGER

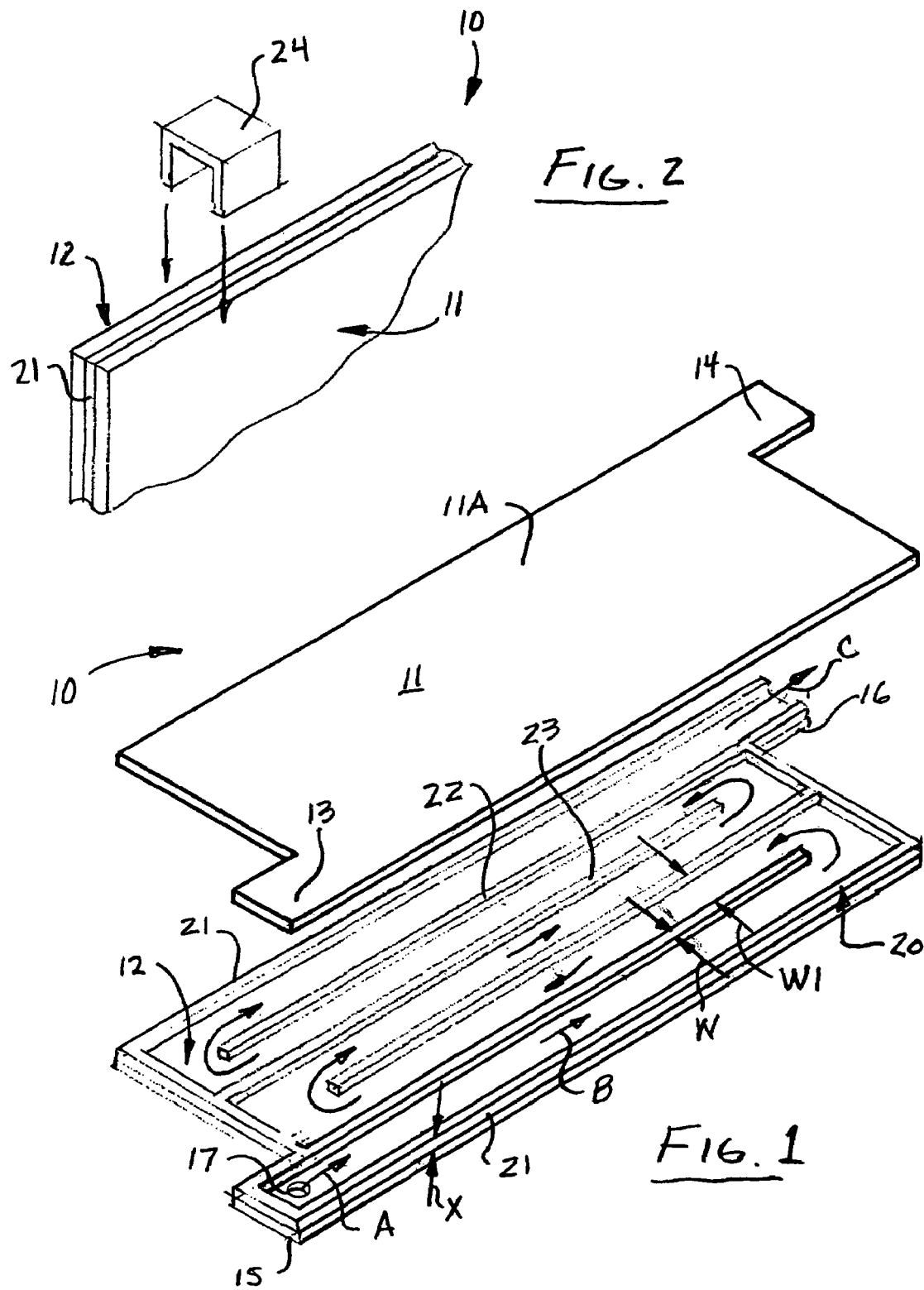

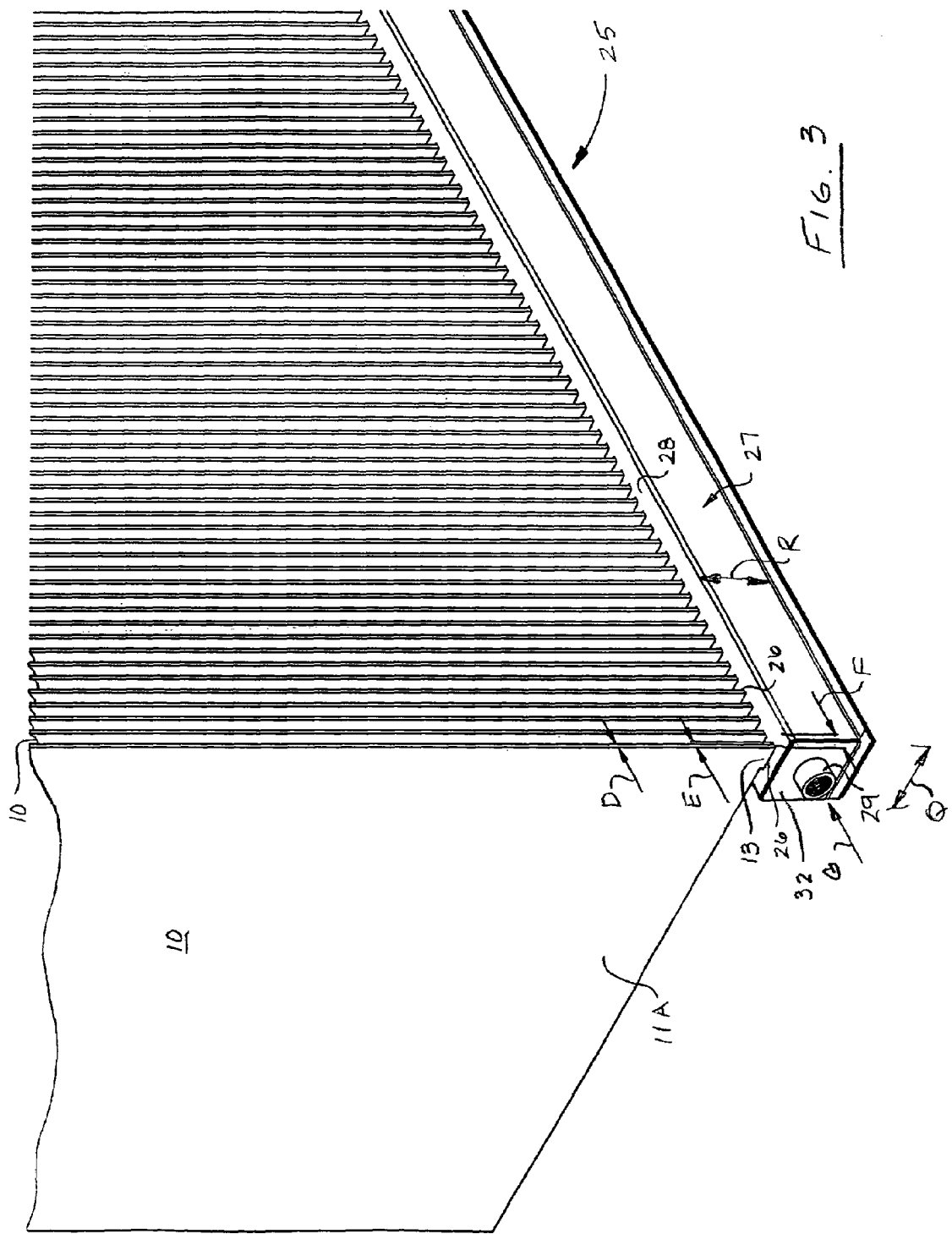

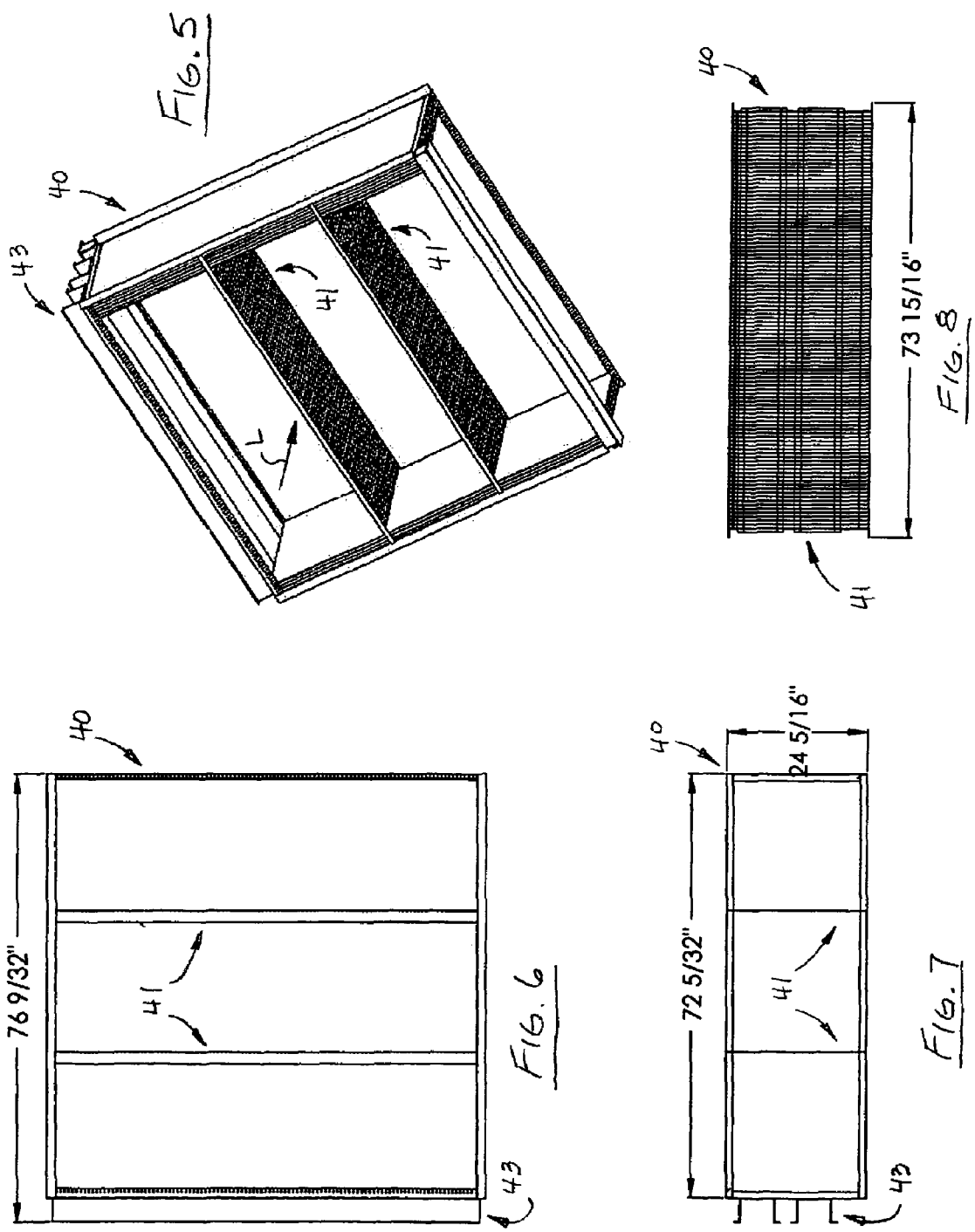

D-Point Tower Flow Diagram
• 90% D-Point Case
• Combined Tower Case

Conditioned Makeup Air Cooled by a Dew Point Tower

DEW POINT COOLING TOWER, ADHESIVE BONDED HEAT EXCHANGER, AND OTHER HEAT TRANSFER APPARATUS

This invention relates to wet cooling tower and liquid-to-gas heat exchanger methods and apparatus combinations.

More particularly, the invention relates to a cost effective and thermally efficient gas-to-liquid heat transfer plate assembly that is particularly effective as an air cooler to transform a wet cooling tower to a heretofore unachievable dew point temperature limited cooling tower.

In another respect, the invention relates to a cooling tower that utilizes inlet air that has been sensibly cooled to achieve a wet bulb temperature cooler than the ambient wet bulb temperature while retaining the same ambient dew point temperature such that it is able to produce water at a temperature approaching this ambient dew point temperature.

In a further respect, the invention relates to a cooling tower that uses some of the product water, which has been cooled to a temperature approaching the ambient air dew point, as the liquid side coolant of liquid-to-air heat exchangers that serve as cooling tower inlet air coolers.

In still another respect, the invention relates to liquid to air heat exchangers that are formed by adhesively bonding flat metal plates forming air channels and liquid channels such that a cost effective heat exchanger configuration is formed accounting for the significant differences in density, specific heat, and heat transfer coefficient between water and air. The requirement for significant surface area to achieve close approach temperatures with surfaces having low heat transfer coefficient is readily accommodated by this design. While particularly effective as the cooling tower inlet air cooler, this new heat exchanger design fills a big gap in heat transfer and fluid flow capabilities and design and manufacturing methods with associated economics for heat transfer in many other applications involving fluids requiring significantly different volumetric flows.

A cost effective ultimate heat sink with the capability to provide large volumes of coolant at temperatures approaching the dew point establishes the heretofore unavailable means of improving the efficiency, capability, and cost effectiveness of various thermal cycles, chemical processes, and space conditioning applications.

As background, a wide variety of heat exchangers are known, and include immersion heaters and coolers, shell and tube heat exchangers, double pipe heat exchangers, spiral plate heat exchangers, plate and frame heat exchangers, and plastic heat exchangers.

Each of these prior art heat exchangers brings with it a set of advantages and limitations. For example, plate and frame heat exchangers in comparison to tube heat exchangers have the advantage that flat metal sheet stock costs less per unit of surface area than tube stock. Another advantage of the plate and frame heat exchanger is the ability to establish fluid pressure boundaries between the outer edges of the plates and the fluid inlet and outlet manifolds. These boundaries are established using a combination of elastomer gaskets that fit into grooves pressed into the edge of the plate surface and long the bolts arranged around the plate periphery that sandwich the heat transfer plates and connect two end plates. Still another advantage of plate and frame heat exchangers is that they offer many possibilities for fabricating heat exchange flow passages that are aerodynamically and hydraulically effective to support fluid flow and heat transfer while minimizing pressure loss. However, plate and frame heat exchangers are not effective for heat exchange between fluids requiring large volumetric flows or fluids of significantly different density and/or specific heats. In other words plate and frame heat exchangers are not effective for heat transfer between air and water.

In general, all prior art heat exchangers have physical characteristics that limit their capability to economically and effectively transfer heat between two fluids that have significantly different volumetric flow rates. This difference in volumetric flow rates occurs when there are differences in density, specific heat, and/or heat transfer coefficient between the two fluids. A common situation involving such an occurrence is when one fluid is a liquid and the other fluid is a gas. In the case of air and water at 70 degrees F., the difference in specific heat is a factor of 4, the difference in densities is a factor of 830, and the difference in heat transfer coefficient is about a factor of 100. Consequently, to be effective, the heat exchanger must be able to accommodate a volumetric flow rate of air that is more than a thousand times that of the water side flow. The physical characteristics that limit the ability of prior art heat exchangers to satisfy this heat transfer need are as follows:

Tube and shell heat exchanger—This prior art heat exchanger is limited by the approximate 1-to-1 relationship of the surface area inside the tube to the surface area outside the tube. The challenge with higher volume flows on the shell or outside surface of the tube is that all elements of the gas stream cannot be brought in close enough contact with the tube without adding extended surface which is costly and requires multiple additional manufacturing steps.

Plate and frame heat exchanger—The prior art plate and frame heat exchangers are designed and manufactured to exchange heat between fluids of relatively similar flow rates. In particular, the inlet and outlet manifolds are sized to interface with the plates so as to distribute the flow without occupying a large portion of the heat transfer surface. To do this the flow rates of the two fluids must be similar and one will find heat transfer between two liquids as the dominant application for this type of heat exchanger.

Flat plate heat exchangers—The prior art flat plate heat exchangers exist but have seen limited application success since fabrication involves welded or brazed flat plate joints with stamping and fusion bonding the plates to form flow channels. The fabrication of these joints is resource intensive and the resulting joint is in a configuration that forms a stress concentration point with associated corrosion, thermal cycle fatigue, and structural stress problems.

Spiral plate heat exchangers—The prior art spiral plate heat exchangers are fabricated by stamping small flow channels in flat plate, welding or brazing the two flat plates together, and then wrapping the plate in a spiral. This heat exchanger is best suited for applications in which the flow rates are relatively low and pure counter flow is required to give a very close approach for two fluids with like volumetric flows.

In summary, current art in heat exchanger design and fabrication as represented by review of current patents, technical society publications, industry publications, engineering manuals, and industry commercial offerings, shows no viable design has been put forth that addresses these limitations.

The design, performance and efficiency of wet cooling towers has long been determined by and tied to the ambient air web bulb temperature. This has impacted the efficiency of thermal cycles and many chemical processes since they are directly dependent on the temperature of the ultimate heat sink. Additionally, other chemical processes and applications have temperature dependent threshold conditions making them very sensitive to heat sink temperature with a strong advantage for heat sink temperatures below the ambient wet bulb. A review of the prior art associated with cooling tower design as represented by review of current patents, technical society publications, industry publications, industry journals, engineering manuals, and industry commercial offerings, shows that while one attempt has been made to suggest application of an evaporative cooling apparatus, no viable design has been put forth with broad application that removes this constraint on cooling tower design.

A conventional cooling tower is a device that is used to reject heat by using an ambient air stream to support evaporation thereby cooling a water stream to a lower temperature and then expelling the moist air with extracted heat from the water into the ambient air atmosphere. Heat is transferred in a cooling tower by conduction, radiation, and convection. Sensible heat from the water at the water inlet and air exit raises the temperature of the air flowing through the cooling tower. However, the dominant heat extraction process in a wet tower is evaporation because of the behavior of water where a small portion of the water that is being circulated is evaporated into the ambient air stream. The evaporation of this small amount of water significantly cools the remainder of the water since it pulls the latent heat of vaporization from the surrounding water and the specific heat of water is two orders of magnitude lower than the latent heat of vaporization. Air passing through the cooling tower can only support evaporative cooling to the point where it reaches 100% relative humidity with this cooling slowing down as it approaches this end point. This limitation drives the design ratio of air to water flow in a cooling tower and particularly a dew point tower where conditions are pushed closer to 100% relative humidity or the dew point with the typical design values for this ratio being very close to two to one. As the ratio of airflow to liquid flow increases (L/G ratio decreases), the surface area of the water film must increase to support effective air to water interaction.

Conventional cooling towers include direct and indirect cooling towers. A direct or open circuit cooling tower is an enclosed structure including a system to distribute warm input water over fill material. Fill is available in many materials and typically is made of cellulose, wood, ceramic, metal, or plastic. Fill design features, particularly those to provide high surface area to volume ratios and yield a large ambient air to water interface to facilitate high air flow to liquid flow ratios and the associated moisture and heat transfer characteristics, are important drivers of cooling tower performance. Water returning with heat rejected from a process application cools as it is distributed across the fill, descends by gravity, contacts air passing in the opposite direction, and gives up through evaporation heat and moisture to this passing air. Cooled water is collected in the sump of the tower and made available to the pump for delivery to the process application being cooled. Heated and moisture laden air leaving the fill is discharged into the atmosphere at a point that prevents this air from being drawn back into the cooling tower. The fill may comprise film fill or splash fill.

Film fill comprises vertically oriented surfaces over which a thin film of water spreads. By way of example and not limitation, FIG. 18 illustrates cross-corrugated film fill 93. Water 94 travels downwardly through fill 93 while air 95 travels upwardly through fill 93. FIG. 19 illustrates vertical film fill 96. Water 98 travels downwardly through fill 96 while air 97 travels upwardly through fill 96.

Splash fill consists of horizontal splash elements that create numerous small droplets to produce a large combined surface area. By way of example and not limitation, FIG. 17 illustrates splash fill comprised of a plurality of layered spaced apart screens 90. Water 91 travels downwardly through fill 90 while air travels upwardly through fill 90.

In the practice of the invention the thermal capacity of a cooling tower can vary to several million tons, but typically is at least one ton, or 12,000 BTU/hr.

In an indirect, or closed circuit, cooling tower, the fluid being cooled does not directly contact ambient air. The fluid being cooled typically is water or a water glycol mixture or some chemical or other fluid stream where it is important to keep the fluid stream isolated from other fluids but achieving a very close cooling approach temperature is necessary. Such an indirect cooling tower has two separate fluid circuits, an external circuit and an internal circuit. The external circuit recirculates water over the exterior of the internal circuit. The internal circuit comprises a closed circuit of coils and tubing that receive hot fluid from an associated industrial or other process. The hot fluid is cooled and returned to the associated process. Heat from the coils is transferred to water and air flowing over and contacting the coils. Since the lowest temperature in the external circuit is the wet bulb temperature of the inlet air the appropriate dew point tower features can be adapted to an indirect tower. Namely, a circuit to sensibly cool the inlet air to lower the wet bulb temperature can be added to the tower. Such action will typically improve the efficiency of the application process and reduce the size of many of the components.

Cooling towers are also classified according to how the air flows with respect to the water in the tower. In a counter-flow cooling tower, air travels upwardly through the fill or coils, opposite the downward direction of water. In a cross-flow cooling tower, air travels horizontally through and transverse the downward direction of water. While cross-flow and counter-flow towers both can be designed with dew point tower features to improve their performance, the counter-flow cooling tower is the most efficient and therefore is able to take the most advantage of the improved temperatures of the dew point tower.

Cooling towers are also classified in terms of how air is moved through the towers. Mechanical draft towers rely on power-driven fans to draw or force air through the tower. Natural draft tower use the buoyancy of exhaust air rising in a tall chimney to produce draft. The structure or fairing of the tower establishes the air flow path through the tower. While the air-to-water heat exchanger at the inlet of the cooling tower increases the resistance to air flow in the cooling tower with associated impacts on natural draft and mechanical draft design features each of these tower designs benefits from the dew point tower features.

Mechanical draft cooling towers are also classified in terms of how the fan moves air through the tower. An induced draft tower has the fan on the exhaust of the tower such that air is pulled into and through the tower. A forced draft tower has the fan on the inlet side of the tower and pushes air through the tower. Air distribution tends to be more uniform with an induced draft fan where the flow resistance of the individual flow paths governs the flow distribution more than the jets of flow from the fan. The density of the air exiting the tower is warmer which tends to require more energy for the same differential pressure.

U.S. Pat. No. 6,854,278 to Maisotesenko et al. suggests the use of an indirect evaporative cooling heat exchange apparatus (hereinafter referred to as '278 apparatus or heat exchanger) to sensibly cool air entering a cooling tower thereby lowering the effective cooing tower inlet wet bulb temperature and supporting the generation of cooling tower discharge temperatures below the ambient wet bulb temperature.

A number of patented configurations for indirect evaporative cooling exist and like Patent '278 suggest that this apparatus can be used to cool air or water and that some volume of water is available at the sump of the evaporative cooling apparatus that can be used for cooling. U.S. Pat. No. 6,845,629 to Bourne et al. suggests that the apparatus can be extended in length to form a source of cool water and that the temperature of this fluid is below the ambient wet bulb temperature and approaching the dew point temperature.

The description of related art in Patent '629 states: "Simple evaporative coolers benefit from the psychrometric process in which dry air and water can be cooled by adding moisture. At their performance limit, these coolers can cool both air and water to the outdoor wet bulb temperature. Multi-stage evaporative coolers use an indirect evaporative process to cool some of the air without adding moisture. This indirect process also lowers the wet bulb temperature of the indirectly-cooled air, making it possible in a second, direct cooling stage, to cool both air and water to a lower temperature than the wet bulb temperature of the original dry air. Additional indirect stages after the first can continue lowering the wet bulb temperature to achieve cooler and cooler "product" (air or water); the theoretical limit is the dew point temperature of the outdoor air. However, it is not practical to achieve this limit for cooling air because a great deal of "parasitic" energy would be consumed forcing air through the multiple indirect stages."

Patent '629 further states: "In the prior art, multi-stage evaporative cooling processes have primarily been applied to cooling air in applications where the lower outlet air temperatures (compared with a direct evaporative process) allow two-stage evaporative cooling to be substituted for a vapor-compression mechanical cooling process. One such example is the "Regenerative Evaporative Cooler" described in U.S. Pat. No. 6,338,258. This design uses alternating wet and dry heat exchange passages to cool a dry air stream, with a portion of the cooled air then supplying the wet "secondary" passages that indirectly cool the dry passages. The dry air stream can be further evaporatively cooled in a direct stage to complete the process before being delivered into a building as supply air. U.S. Pat. No. 5,301,518 describes another indirect stage that uses a portion of the indirectly cooled air stream as secondary air for the wet passages. This design features a low profile plate system that eliminates the circulation pump by wicking water from the sump to the wet plate surface. Both of these designs are intended solely to cool air in the indirect stage."

Patent '629 further states: "Two stage systems are seldom used to cool water. Many one-stage evaporative cooling systems called "cooling towers" are used to cool condenser water in large cooling systems. Cooling towers use fans to draw outdoor air through a distributed falling water pattern, such that the air is humidified as it cools the warm water leaving the chiller condenser. Cooler water entering the condenser increases chiller efficiency, and increasing the cooling tower size is often a cost-effective strategy for lowering the water temperature. But, simple cooling towers cannot cool water to below the outdoor air wet bulb temperature, as two stage units can. In the future, if energy costs continue to rise as expected, two stage cooling towers might achieve favorable paybacks."

The indirect evaporative cooler apparatus of '278, the prior art two stage evaporative coolers discussed in '629, and the two stage evaporative cooling apparatus of '629 are all fundamentally different from the present invention. These differences relate to the approach taken to develop and apply a source of coolant as well as in the composition of this coolant stream developed to sensibly cool an air stream for use as the cooling tower inlet air necessary to form a dew point tower. In particular, in each of these prior art systems the evaporative cooler section of the apparatus develops the source of coolant to cool the dry air and in the '278 patent alternate embodiment this dry air stream is directed into a cooling tower as the inlet air while in the present invention the source of coolant to cool the inlet air is the cooling tower itself. The design features and performance of the apparatus are therefore dramatically different with the present invention avoiding the many issues associated with using the two stage system including the significant issue associated with all such systems identified in the '629 patent "... it is not practical to achieve this limit (dew point) for cooling air because a great deal of "parasitic" energy would be consumed forcing air through the multiple indirect stages."

Fundamentally, the present invention uses cooling tower outlet water that has been cooled to a temperature approaching the dew point as the coolant of an air-to-water heat exchanger that sensibly cools the ambient air at the inlet to this cooling tower. The air-to-water heat exchanger in this case has but one function, is specifically designed for this function, and has a water side that is not a mixture but is solid water. The '278 patent and other multi-stage evaporative coolers on the other hand use the evaporative cooler section as the source of coolant and the dry air stage of this multi stage cooler as the supply source of sensibly cooled air for the cooling tower. Since these multi-stage coolers all share fundamental features with associated performance limitations, the '278 patent has been selected as the apparatus for comparison and the basis for discussion of the performance limitation.

The evaporative cooler section of the '278 patent and other multi-stage evaporative coolers use a mixture of air and water (air making up the larger fraction) as the coolant in the wet side of a heat exchanger (with the boundary plate between the wet and dry sections forming the heat exchange surface area) sensibly cooling a dry side air stream. The '278 apparatus uses a significant fraction (up to 100%) of the sensibly cooled air stream as inlet air for the wet side. The air discharge from the wet side of the '278 apparatus is a significant volumetric flow stream and is available from different stages of the wet side for use in the cooling tower. Unfortunately, the streams that are lower in moisture level have a higher wet bulb temperature since they have not received as much sensible cooling and those that have a higher moisture level are not very effective as a source of coolant in the cooling tower.

The subject '278 indirect evaporative cooler apparatus in some configuration may theoretically: a) be able to produce sensibly cooled air to serve as inlet air for a cooling tower in order to produce water that is cooler than the ambient dry bulb and approaching the ambient wet bulb, and b) to provide such water in sufficient volume that it can satisfy the needs of a specific application. However, it brings with it a number of significant limitations and deficiencies for cooling tower applications that are not present in and do not suggest the present invention. These limitations and deficiencies impact cooling tower application design, application cooling tower performance, maintenance and operational life of the apparatus, operating flexibility, parasitic energy loss, and general design of the installation. Some of the key features of the design as described in the '278 patent as well as the limitations resulting from these features are discussed below and addressed or avoided by the unique fundamental features the present invention which are discussed later herein.

The description of the preferred embodiment of the '278 apparatus and that of other prior art multi-stage evaporative cooling towers has ambient air being directed into narrow channels to sensibly cool this air by transferring heat from the air to the channel or cooling plate that separates the dry and wet sides of the apparatus. On the wet side of the apparatus cooling is accomplished by the evaporation of water along with convection and conduction cooling by the air and water flowing in these channels.

While not discussed in the '278 patent, this apparatus takes advantage of the thermal behavior of mixed dry air and water vapor as present in ambient air. Namely, the behavior where the wet bulb temperature is always less than or equal to the dry bulb temperature and is equal only when both are at the dew point temperature. The significance of this is that the air that is sensibly cooled on the dry side of the apparatus exits the dry side with dry bulb temperature slightly higher than the temperature of the cooling plate and, more importantly, a wet bulb temperature that is cooler than this dry bulb temperature and slightly below that of the cooling plate.

Some of the air arrives at the '278 wet channel through holes in the channel allowing communication of air between the wet and dry channels and the remainder arrives by features that direct some fraction (up to 100%) of the dry side air discharge through the wet side. The flow of air on the wet side is a driver that determines the delivery temperature of the apparatus since the air flow rate must be high enough and moisture content of this air low enough to carry the moisture away and not meeting these conditions will result in higher wet side temperatures and therefore higher product delivery temperatures.

As the air moves up the wet channel, the humidity and wet bulb temperature increase resulting in evaporation at a higher temperature and therefore a higher cooling plate temperature. Moisture and air each wick and diffuse according to clear validated principles when not contained by effective flow boundaries; therefore, the implications of holes and passages are more complex than first impressions would suggest. While not discussed in the patent, the apparatus uses the flow resistance created by sizes and configuration of dry channel holes, dry channel discharge opening area size, dry channel surface roughness, wet channel entrance area size and configuration, wet channel surface and wicking material flow resistance, and the flow characteristics of the fan to establish and maintain the design flow distribution. This flow and distribution of air is a critical driver for the performance of the apparatus and the dependency of this on each and every one of the above factors makes it very susceptible and sensitive to fouling, scaling, corrosion, and other aging factors that can change this delicate balance.

This flow distribution is shown in FIG. 1 of the '278 patent with the air entering the top of the dry plate as indicated by arrow 2A and proceeding to openings in the cooling plate that communicate between the dry and wet side being identified as H1, H2, H3, thru Hn. The air coming through the plates is diverted to exit in multiple streams on the side of the wet plate as indicated by arrows 2X, 2Y, 2Z. The air exits the dry side plate at the bottom as indicated by 2A with some returning to the wet side as indicated by 2C. Water, indicated by reference character 1 in FIG. 2 of the '278 patent, flows down the wet side of the cooling plate. Evaporation of the water into the air stream 2C flowing upwardly over the plate cools the water. The cooled water cools the plate 4. The plate 4 cools air flowing downwardly in the direction of arrow 2A over the dry side of the plate.

FIG. 13 of the '278 patent illustrates how sub-streams of air produced by the '278 heat exchanger can be directed into a cooling tower. One such group 120 of sub-streams passes over a baffle plate 118 and comprises relatively warm and humid air. A second such group 122 of sub-streams is cooler than sub-streams 120, but is also more humid. A third such group 124 of sub-streams passes through the dry side channels of the heat exchanger 100 and directly into the cooling tower. The group 124 of sub-streams is relatively cooler than sub-streams 122 and are relatively dryer than sub-streams 120 and 122.

In sum, the '278 evaporative cooling apparatus appears able to cool the wet bulb temperature of incoming air to a temperature that is above the dew point and have the potential to use this cooled air advantageously for some applications in a cooling tower.

It does, however, appear that the '278 heat exchanger—cooling tower system would, practically and economically speaking, bring with it a number of unaddressed performance limiting deficiencies.

First, scaling is expected to occur in the '278 closed channel wet side plates where a mixture of air and water (air making up the larger fraction) are used as the coolant with water evaporating to absorb the heat being transferred to sensibly cool the dry side. This wetting and drying associated with evaporation will generate a hard scale, particularly when using hard water in conjunction with the wicking material that is attached to the plate sides. Startup and shutdown of the apparatus brings additional challenges to keep water out of the dry side and to keep scale residue from forming at these points on the dry side and at the dry side/wet side interface hole and other wet side areas. Such scale formation reduces heat transfer and changes the heat transfer profile of the plate such that acceleration of scale formation is expected to occur. One means of delaying scale buildup is to increase the system feed and bleed rate or to use distilled or purified water. Increasing the feed and bleed rate changes the dynamics on the wet side since it can impact the temperature profile on the wet and dry sides of the apparatus. Adding a water purification system to an application clearly increases the cost. Therefore, each of these results and actions impact cost, performance, and operation.

Second, the transfer of heat from air on the dry side of a '278 plate to the water and air on the wet side of the plate is limited by the boundary layer heat transfer coefficients, the terminal temperature difference, and the total heat transfer surface area available. The dry side tends to be the limiting side because of the heat transfer coefficient for air flowing across plates. The existence of water in a liquid phase on the wet side yields a higher heat transfer coefficient. Keeping the air flow area small to increase the velocity of the air across the plates is one method of improving the heat transfer coefficient on the dry side of the plate. These heat transfer and fluid flow behaviors and impacts must be balanced with the other implications and demands of air flow distribution in the apparatus. While there clearly is a point that is best, considering all these factors, it is unlikely that this point will fall at the point of best cooling tower performance. Therefore, significant compromises in the apparatus design and/or operation with attendant fabrication, operation, performance, and cost consequences are likely.

Third, the water flow rate through the wet side of '278 heat exchanger is limited and is less than the air flow rate. The ratio of air flow to water flow must be kept in balance to achieve the desired performance of the '278 heat exchanger. If the flow of water is too great, and a large quantity of water reaches the bottom of the wet side of the plate, the performance of the heat exchanger is compromised. Flow rates much beyond that necessary to satisfy the evaporation rate and bleed rate would quickly push the '278 heat exchanger away from its ideal operating configuration and compromise the ability of the unit to achieve temperatures close to the dew point. This means that the '278 apparatus is not in and of itself an effective source of coolant water.

Fourth, 20% to 100% of the cooled air from the dry side of the plates is cannibalized and passed over the wet side of the plates to absorb and transport the moisture associated with the wet side evaporative cooling process. The fraction of air that must be cannibalized is dependent on the relative humidity of the input air. The ability to perform as a dew point cooling tower is dependent on having a high flow rate of "dry" (no change in moisture content) sensibly cooled air enter the cooling tower inlet. If all (100%) of the dry side air is cannibalized and passed over the wet side this functional objective can not be satisfied. Since this parameter changes over the course of a day, week, month, and year, performance must be left to float or instrumentation and controls added that are not discussed in the application. Incorporating such features into the design may not be practical or at the least are likely to dramatically impact performance and costs. The cooling tower application needs inlet air that is able to absorb moisture and transport it out of the system to work effectively. This is why sensibly cooling the air without adding moisture is the objective.

Fifth, The air flow path of the '278 apparatus is complicated with multiple direction changes, orifices, transitions, baffles, and long flow channels that offer resistance to air flow as a function of the velocity impacting the system fan horsepower requirements. In this regard, there is a competing need to increase the velocity to improve heat transfer and lower surface area requirements countering the need to minimize fan energy requirements. This particular performance limiting deficiency was determined to be sufficiently significant in the '629 patent that the patent states: "it is not practical to achieve this limit (dew point) for cooling air because a great deal of "parasitic" energy would be consumed forcing air through the multiple indirect stages."

Sixth, directing warmer and/or more humid air streams 120, 122 into a cooling tower in the manner suggested by the '278 patent is theoretically possible. The need to do this is driven by the need to take advantage of a significant amount of energy that is invested in moving the air through the apparatus. One of many drawbacks, however, to this procedure is that it not only increases the energy requirements but increases the cost and complexity of the cooling tower system and associated instrumentation and controls. Another drawback is that the point in the cooling tower at which air streams 120, 122 should be directed is a moving target, and varies with ambient humidity, tower heat load, and total air flow through the tower. In order to achieve a desired efficiency, the point at which air streams 120 and 122 enter a cooling tower must be continually adjusted.

Seventh, the '278 heat exchanger is relatively complicated system requiring forming plates with apertures, forming plates with wet side wicking material, directing air flow in multiple different directions, controlling water flow on the wet side with respect to air flow on the wet side, and the recycling of water. Apart from the scaling maintenance issues discussed above, the initial construction costs of a '278 heat exchanger appear significant, particularly in combination with the baffles and dampers required in connection with integrating the '278 heat exchanger in a cooling tower in the manner suggested by the '278 patent.

Accordingly, it would be highly desirable to provide an improved heat exchanger and an improved heat exchanger—cooling tower system/apparatus that is able to deliver coolant at temperatures approaching the dew point without the limitations and weaknesses identified above.

Therefore, it is a principal object of the invention to provide an improved system for reducing the wet bulb temperature of ambient air and of providing such cooled air to a cooling tower.

Another object of the invention is to provide an improved, more efficient, less expensive heat exchanger that has broad application beyond the cooling tower but particularly in applications where a significant difference exists in volumetric flow rates.

These and other, further and more specific object and advantages of the invention will be apparent to those skilled in the art from the following detailed description thereof, taken in conjunction with the drawings, in which:

FIG. 1 is an exploded perspective view illustrating a hollow heat exchange member constructed in accordance with the invention;

FIG. 2 is a perspective view illustrating a U-shaped clip utilized to reinforce the heat exchange member of FIG. 1;

FIG. 3 is a perspective view illustrating in part a heat exchanger constructed utilizing a plurality of the heat exchange members of FIG. 1;

FIG. 5 is a perspective view illustrating a support assembly for a plurality of the heat exchange members of FIG. 1;

FIG. 6 is a top view further illustrating the support assembly of FIG. 5;

FIG. 7 is a side elevation view further illustrating the support assembly of FIG. 5;

FIG. 8 is a front view illustrating the support assembly of FIG. 5;

Figure 3A:
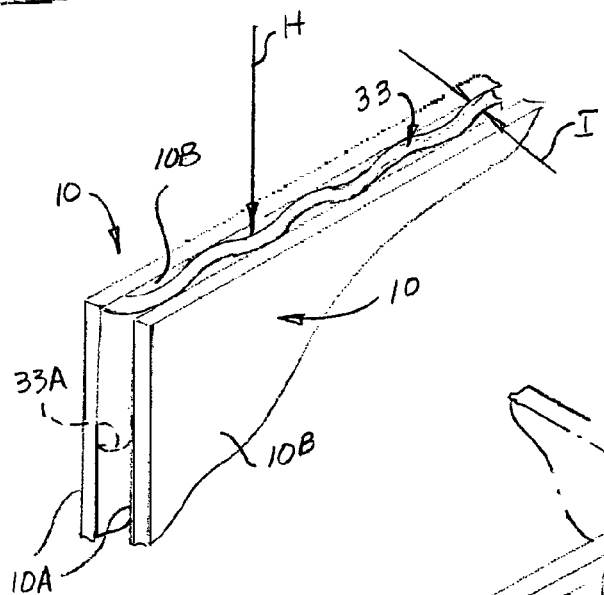
FIG. 3A is a partial perspective view illustrating an alternate embodiment of the heat exchanger of the invention, which embodiment utilizes a plurality of the heat exchange members of FIG. 1.

Briefly, I have discovered an improved cooling tower system. The system reduces the temperature of a coolant to below the wet bulb temperature of ambient air and to approach the dew point of ambient air. The system comprises a cooling tower with a housing and fill; a system to direct a liquid coolant through the fill; an air-to-water heat exchanger to sensibly cool ambient air to produce cooled air having a wet bulb temperature less than the wet bulb temperature of ambient air, the heat exchanger having an outlet through which air exits after passing through the heat exchanger; a system to direct cooled air from said heat exchanger through said fill to produce chilled liquid coolant having a temperature below the wet bulb temperature of the ambient air; and, a system to direct the chilled liquid coolant from the cooling tower to the air-to-water heat exchanger to sensibly cool ambient air to a wet bulb temperature less than the wet bulb temperature of ambient air. The heat exchanger can comprise an adhesively bonded plate gas-to-liquid heat exchanger comprising a plurality of spaced apart hollow heat transfer units each comprised of a pair of spaced apart metal plates adjoined by adhesive polymer strips to form the boundaries of a multi-pass channel intermediate the pair of plates for a pressurized liquid to flow through the channel to transfer heat through the plates and between the liquid and a gas flowing intermediate the spaced apart units. The approach temperature can be equal to or less than the difference between the dry bulb temperature and wet bulb temperature of air at said outlet of said heat exchanger.

In another embodiment of the invention, I provide an adhesively bonded plate gas-to-liquid heat exchanger. The heat exchanger comprises a plurality of spaced apart hollow heat transfer units each comprised of a pair of spaced apart metal plates adjoined by adhesive polymer strips to form the boundaries of a multi-pass channel intermediate the pair of plates for a pressurized liquid to flow through the channel to transfer heat through the plates and between the liquid and a gas flowing intermediate the spaced apart units.

In a further embodiment of the invention, I provide an improved method of designing a cooling tower to serve a process by rejecting waste heat to the environment while supplying coolant to the process at a temperature less than the ambient wet bulb temperature. The method includes the following steps:

Step 1. Establish a process flow diagram by connecting and establishing the air side and liquid side process relationships for the components in a dew point cooling tower including the process to be cooled by the dew point cooling tower. These components include the wet cooling tower, cooling tower inlet air to water heat exchanger, and the associated pumps, valves, instrumentation, and controls;

Step 2. Establishing the design ambient conditions (dry bulb, wet bulb, and dew point temperatures);

Step 3. Identify the process heat load (BTU/hr) to be rejected by the dew point tower and the upper limit for the coolant return temperature;

Step 4. Conduct a preliminary sizing for the cooling tower using the subject process heat load with a 2 degree approach temperature and a 0.5 l/g ratio;

Step 5. Using the ambient air temperature and the upper limit for the coolant return temperature determine whether the air to water heat exchanger coolant is to be cooled in the main tower or in a separate tower or cell; (The cooling tower size and air flow, and inlet air heat exchanger surface area are all minimized with higher inlet air heat exchanger coolant return temperatures. Restrictive process return temperature requirements where the maximum return temperature is limited to less than 30 degrees of the design ambient dry bulb temperature suggest but do not force the use of a separate cell to cool the inlet air heat exchanger);

Step 6. Establish a rough cut for the air to water heat exchanger air flow and heat load using the ambient conditions and preliminary cooling tower sizing information;

Step 7. Develop a preliminary heat transfer surface area sizing for the Dew Point Tower air inlet heat exchanger;

Step 8. Determine the post sensible cooling air outlet dry bulb and wet bulb conditions for the cooling tower inlet air heat exchanger Step 9. Determine the approach temperature for the cooling tower and the approach temperature for the inlet air heat exchanger such that the sum of these approach temperatures is equal to the difference between the dry bulb and wet bulb temperatures of the air entering the cooling tower;

Step 10. Size the heat exchanger to produce sensibly cooled air having a the desired dry bulb temperature; and, Step 11. Using the sizing data and associated performance information produced above, optimize the cooling tower size and parameters along with the cooling tower inlet air heat exchanger in an iterative manner to arrive at performance parameters that will produce sufficient coolant to cool the cooling tower inlet air heat exchanger and produce the designed cooling tower performance.

The heat exchanger can comprise an adhesively bonded plate gas-to-liquid heat exchanger comprising a plurality of spaced apart hollow heat transfer units each comprised of a pair of spaced apart metal plates adjoined by adhesive polymer strips to form the boundaries of a multi-pass channel intermediate the pair of plates for a pressurized liquid to flow through the channel to transfer heat through the plates and between the liquid and a gas flowing intermediate the spaced apart units. The cooling tower has an approach temperature which can be equal to or less than the difference between the dry bulb temperature and wet bulb temperature of air at said outlet of said heat of the heat exchanger.

Turning now to these drawings, which depict the presently preferred liquid-to-gas heat exchanger embodiments of the invention for the purpose of illustration and not limitation of the scope of the invention and in which like reference characters refer to corresponding elements throughout the several views, FIG. 1 illustrates a hollow heat exchange member generally identified by reference character 10 and including a pair of metal panels 11 and 12. Panel 11 includes feet 13 and 14. Panel 12 includes feet 15 and 16. The shape and dimension of panel 11 is identical to panel 12, except that an aperture 17 is formed in the foot 15 of panel 12. A template or ribbed skeletal framework 20 of adhesive performs the functions of securing panel 11 to panel 12, of defining a winding or multi-pass channel along which a fluid travels intermediate panels 11 and 12, and of providing pressure resistant channel sides that extend from one panel 11 to another panel 12. The adhesive framework 20 includes a peripheral portion 21, and includes a plurality of fingers 22, 23 extending inwardly from portion 21. The width, height, and length of each portion 21 or finger 22, 23 can vary as desired. The width, indicated by arrows W in FIG. 1, of a portion 21 or finger 22, 23 typically preferably is in the range of one-eighth to one-half inch. The height, indicated by arrows X in FIG. 1, of a portion 21 or finger 22, 23 typically preferably is in the range of one-sixteenth to one-half of an inch.

Member 10 is assembled by pressing panel 11 against adhesive framework 20 such that panel 11 is spaced apart from, generally parallel to, and in registration with panel 12. Fluid flows through aperture 17 and along the channel that is defined by framework 20 and that extends intermediate spaced apart panels 11 and 12. The continuous winding path of fluid from feet 13 and 15, intermediate panels 11 and 12, and out through feet 14 and 16 is indicated by arrows A, B, and C and other arrows in FIG. 1.

Framework 20 can consist of any desired structural adhesive bonding material with the preferred embodiment being pressure sensitive adhesive material in the form of double coated high density polyvinyl foam tapes or other polymer materials. The various physical and other properties of the polymer materials can vary as desired, however, it is presently preferred and considered important that the polymer material have a thickness in the range of one-sixteenth of an inch to three-quarters of an inch, have an operating temperature range of from −32 degrees F. to 400 degrees F., and utilize an adhesive (to bond the polymer with metal plates) with a tensile strength of at least sixty psi. When a polymer foam tape with opposing adhesive surfaces (where each surface bonds to a different one of an opposing pair of metal plates) is utilized, it is preferred that the tensile strength of the adhesive exceed that of the foam. These parameters are important in producing a heat exchanger that is practical, cost effective, and operable in a variety of differing climates.

The specific selection of the adhesive material is driven by the application, associated application environment, and issues with assembly cost. Some of the more important factors in adhesive material selection are tape thickness which drives liquid channel height, design operating temperature range, tensile and shear strength which limits the fluid system pressure, solvent or liquid resistance, ultraviolet radiation resistance (UV), cold flex capability, thermal conductivity, cure temperature, cure time, roll sizes, cost per roll, and dielectric strength. By way of example, and not limitation, the structural adhesive material preferred in the practice of the design of water-to-air heat exchangers is the 3M™ 4408 vinyl foam tape one half inch wide was selected as the pressure boundary 21 and one quarter inch wide 4408 tape was selected for the fingers 22 and 23. This tape is an eighth inch thick and is coated on opposing sides with layers of an adhesive that has an operating temperature range from −20° F. to 150° F., a tensile strength of 60 psi, a tensile strength that exceeds the tensile strength of the foam, excellent solvent and UV resistance, and a room temperature curing time of 4 hours. The specific assembly and compression methods to assure bonding of the layers of adhesive on either side of the tape to the plates is dependent on product selection and curing needs, but vacuum compression works well.

In addition to setting the channel height, advantages of the adhesive are the elastomeric flexibility of the adhesive which, along with the effective contact area of the adhesive, functions to spread the stress and eliminate stress concentration issues. Another advantage of the adhesive is that dissimilar materials can be joined together because the adhesive dielectric properties avoid galvanic corrosion and flexibility properties allow for differences in the coefficient of thermal expansion. A further advantage of the adhesive bonding is that its elastomeric flexibility (as well as that of the foam) improves the resistance of the material to thermal cycle and vibration fatigue.

The foam intermediate the layers of adhesive preferably has a tensile strength, modulus of elasticity, and other physical properties sufficient for the foam to maintain the desired spacing between metal plates and adjacent plates in a desired orientation or registration with respect to one another when the plates are vertically and/or horizontally oriented. For example, if the tape is one-quarter of an inch wide and is one-eighth of an inch high (so the spacing between plates when the tape is installed therebetween is one-eighth of an inch), then when the plates are (1) vertically oriented (normal to the ground), the foam does not deform or sag and allow one plate to move with respect to another, and (2) horizontally oriented (parallel to the ground), the foam does not compress to allow the plates to move closer together. Most importantly, these characteristics need to be sufficient to assure the heat exchanger maintains its shape, structure, and integrity under design and test pressures. Such pressure for the cooling tower application typically is in the range of 10 psi to 100 psi. Note that, individually and in combination with one another, additional capacity of the plates to sustain and resist the forces associated with internal pressure for cooling tower heat exchanger and those of other higher pressure applications is achieved through the incorporation of the support structure 40 as illustrated in FIGS. 5 to 8, through use of the corrugated metal plate 33 illustrated in FIG. 3A, and through use of the clip 24 illustrated in FIG. 2.

Metal plates similar to corrugated metal plate 33 can be utilized and inserted to distribute and transfer load and to dramatically increase the internal pressure capability of the heat exchanger of the invention. End plates and tie rods can also be incorporated to increase the internal pressure capability of the heat exchanger. These structural strengthening methods are more important for alternate applications than it is for the cooling tower application.

Figure 3B:
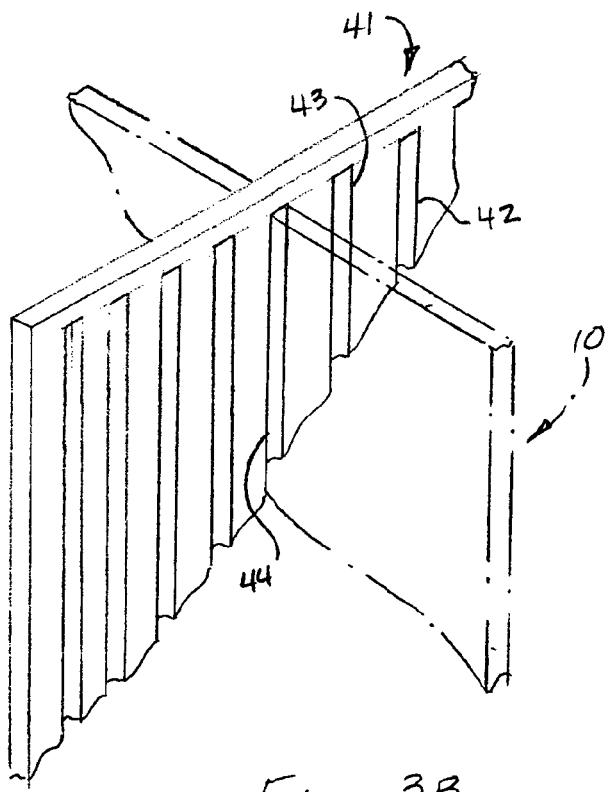
FIG. 3B is a partial perspective view illustrating a heat exchanger support element of the type depicted in FIG. 5.
Figure 3C:
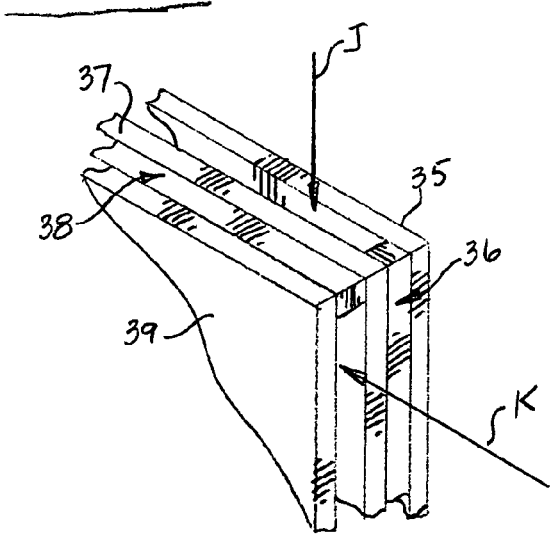
FIG. 3C is a partial perspective view illustrating a heat exchanger constructed in accordance with an alternate embodiment of the invention to transfer heat from one gas to another gas.
Figure 4:
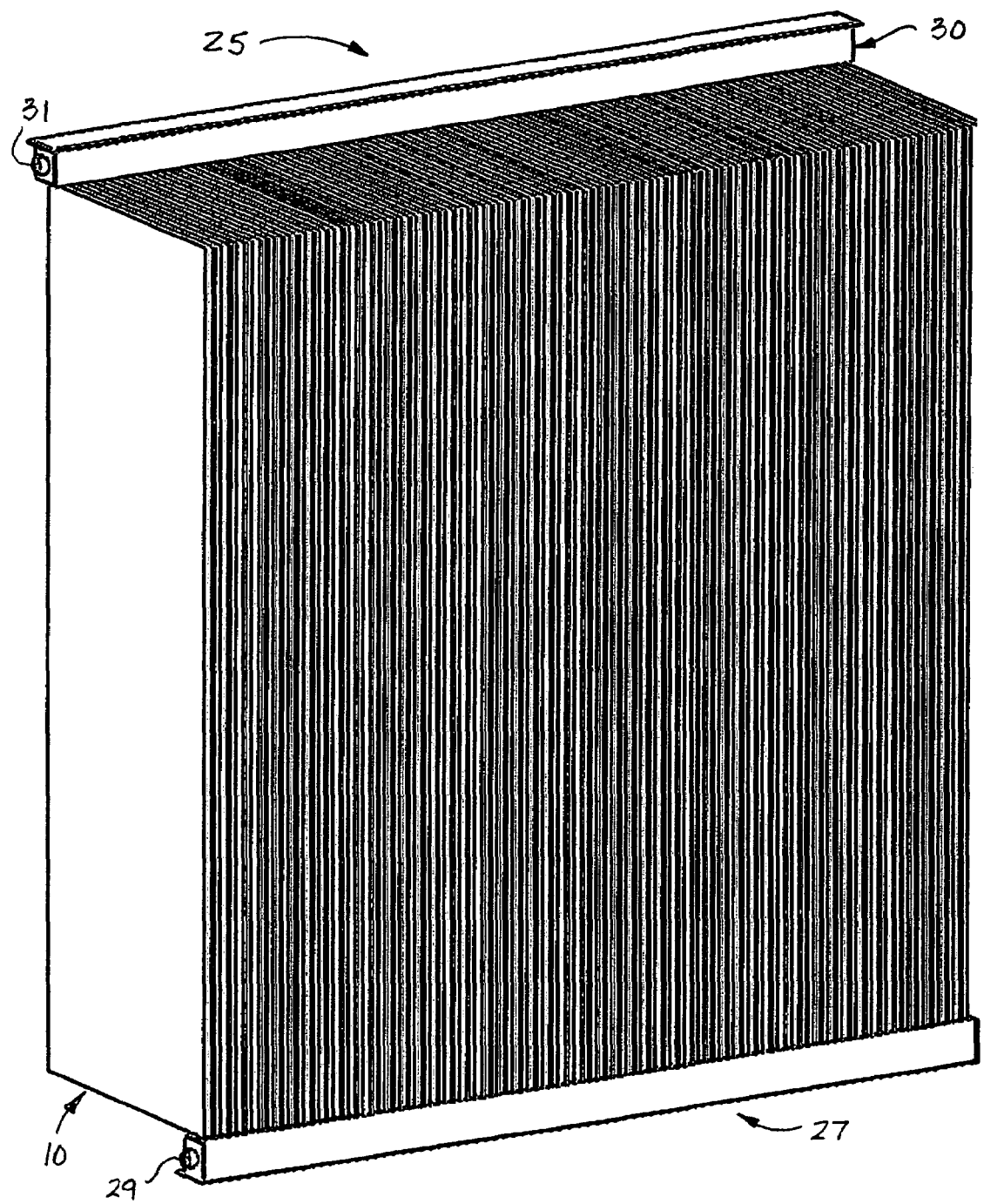
FIG. 4 is a perspective view further illustrating the heat exchanger of FIG. 3.

Once the heat exchange member 10 of FIG. 1 is assembled, it, along with a plurality of like members, is utilized to construct a plate heat exchanger 25 of the type illustrated in FIGS. 3 and 4. Heat exchanger 25 includes one hundred and forty-four spaced apart members 10. The number of members 10 in a heat exchanger can vary as desired. The feet 13 and 15 of each member 10 are inserted in an orthogonal opening 26 formed in an elongate, orthogonal inlet header 27. Openings 26 can be shaped and dimensioned and spaced as desired; however, in the heat exchanger 25, each opening 26 is of equivalent shape and dimension, the space between each pair of adjacent openings 26 is the same, and each opening 26 is sized to permit feet 13 and 15 to be slidably snugly inserted therein. Adhesive caulk (not visible) or any other desired sealing material is used to seal each opening 26 after feet 13 and 15 of a member 10 is inserted therein. Example of adhesive caulk presently preferred is 3M™ 540 adhesive. After the feet 13 and 15 of a member 10 are inserted through an opening 26, the aperture 17 formed in foot 15 is positioned inside header 27. The construction of outlet header 30 is identical or similar to that of inlet header 27, and, the feet 14 and 16 of each member 10 are slidably, snugly inserted and sealed in an opening (comparable to opening 26) formed in header 30 such that a fluid exiting member 10 between feet 14 and 16 flows into outlet header 30 and out orifice 31 formed in header 30. The height R of hollow headers 27 and 30 is presently about two and one-half inches, as is the width Q of each header.

The width, indicated by arrows D, of each member 10 can vary as desired, but presently is 0.176 inch, and ordinarily is in the range of 0.100 inch to 0.500 inch. The distance, indicated by arrows F, from the center of one member 10 to the center of an immediately adjacent member 10 can vary as desired but is presently 0.673 inch. The distance between an adjacent pair of parallel members 10 can vary but is presently in the range of one-tenth inch to about three-quarters of an inch, preferably about one-half inch. The width, indicated by arrows E, of each opening 26 is presently 0.276 inch. The distance from end 32 of inlet header 27 to the closest opening 26 can vary as desired, but likely preferably would be greater than that depicted in FIG. 3 in order to facilitate fluid flow and pressures in inlet header 27. Members 10 need not be parallel to one another. Since, however, fluid flows intermediate members 10 during operation of heat exchanger 25, it is preferred that members 10 be substantially parallel to minimize the increase in pressure that occurs when fluid flows through heat exchanger 25 intermediate members 10.

The gauge of each metal panel 11, 12 can vary over a wide range of gauges dependent on the stiffness required to maintain the desired shape given the internal pressure on the liquid side of the heat exchanger, the width of the liquid channels, design for corrosion allowance, and the design of the heat exchanger support structure. This said, the typical liquid side channels are expected to have a width, indicated in FIG. 1 by arrows W1, in the range of one-fourth to six inches, preferably one-half to four inches, and most preferably one and one half to two inches, and the pressure in the heat exchangers is expected to be sufficiently low that very thin gauge material (28 and 30 gauge) sheets can be used. Additionally, one of the factors that usually influence the gauge of material is joining operations and joint construction which is eliminated by the adhesive joint. Thicker sheets can be easily accommodated in the design. Panels 11, 12 presently have a thickness in the range of 0.0075 to 0.25 inch, preferably 0.010 to 0.20 inch, and most preferably 0.0125 to 0.175 inch.

The orthogonal cross-sectional area of inlet header 27 is parallel to the flat face area 11A of panel 11 in each member 10. Each aperture 17 has a circular cross sectional area ($\pi r^2$) that is also parallel to face area 11A. The cross-sectional area of inlet header 27 and the sum of the area of the apertures in members 10 are selected such that the velocity pressure generated by fluid flowing in inlet header 27 is small relative to the static pressure of fluid in header 27. In particular, the sum of the cross-sectional areas of the apertures should be less than the cross-sectional area of the inlet header to yield such a balance of static and dynamic pressures and achieve uniform liquid flow among the multiple panels. End 32 (including orifice 29) is preferably, but not necessarily, secured to header 27 with adhesive tape or a bead of adhesive. Fluid flows in the direction of arrow G (FIG. 3) through orifice 29 into header 27, into apertures 17, through members 10 into outlet header 30, and out from header 30 through orifice 31.

If desired, the internal channels 22 and 23, or peripheral 21 portion of adhesive framework 20 of a member 10 (FIG. 1) can be constructed to include small passages that permit the escape of gas from one channel to another such that the gas is swept out the top of the panel into the discharge header. These openings are small enough not to impede the flow of liquid through the passages so that the thermal efficiency of a member 10 is not significantly impaired.

FIG. 3A illustrates a corrugated metal plate 33 interposed between an adjacent pair of members 10 to provide additional surface area for a fluid flowing intermediate members 10 in the direction indicated by arrow H. The thickness, indicated by arrows 1, of plate 33 preferably is less than that depicted in FIG. 3A so that the space occupied and pressure increase caused by plate 33 is minimized. Plate 33 can extend over substantially all of the opposing flat face areas 10A and 10B of members 10. Alternatively, one or more strips 33A of corrugated metal can be interposed between members 10 such that each strip extends over only a portion of face areas 10A and 10B. Strips 33A and plate 33 are secured in position with adhesive, clips, welding, or any other desired means. The edge of a strip 33A or plate 33 can, instead of having a sine wave type of configuration that extends between spaced apart members 10 to form fluid flow channels, have a triangle or an octagon type configuration that extends between spaced apart members 10 to form square or octagon tube fluid flow channels. The shape and dimension of the fluid flow channels extending between adjacent, spaced apart members 10 can vary as desired. These shapes can be selected to transfer load from one plate set to another in addition to or in lieu of improving the heat transfer capability of the heat exchanger.

FIG. 2 illustrates a U-shaped clip 24 that can, if desired, be mounted on an edge of a member 10 to increase the structural integrity of member 10. One or more clips 24 can be utilized on a member 10. The length and shape and dimension of clip 24 can vary as desired. For example, clip 24 may extend along the entire length of one edge of a member 10.

In addition to the clip 24 of FIG. 2, another method of strengthening the heat exchanger 25 of FIGS. 3 and 4 is to incorporate endplates and tie rods, straps, or other structural components in arrangements that yield significantly improved structural load capacity. Additional structural load capacity strengtheners such as straps can be implemented in the headers 27 and 30 to facilitate using heat exchanger 25 in a dew point tower or other application.

A further method of providing additional structural support for heat exchanger 25 is illustrated in FIGS. 3B and 5 to 8, and comprises one or more slotted support plates 41 mounted in a frame 40. As illustrated in FIG. 3B, each one of a series of parallel spaced apart slots 42 to 44 cut in a support plate 41 receives and supports a heat exchange member 10 that extends normal to plate 41. In FIG. 5, frame 40 is shown lying on its side. Frame 40 normally would be upright, and would extend upwardly from ground contacting base 43 such that air (or another fluid) flowing generally horizontal to the ground would pass in the direction indicated by arrow L between members 10 mounted in frame 40. Slots 42 to 44 are preferably laser cut to close tolerance in plate 41 such that there is a minimal amount of play or movement of a member 10 in a slot 42 to 44.

Figure 9:
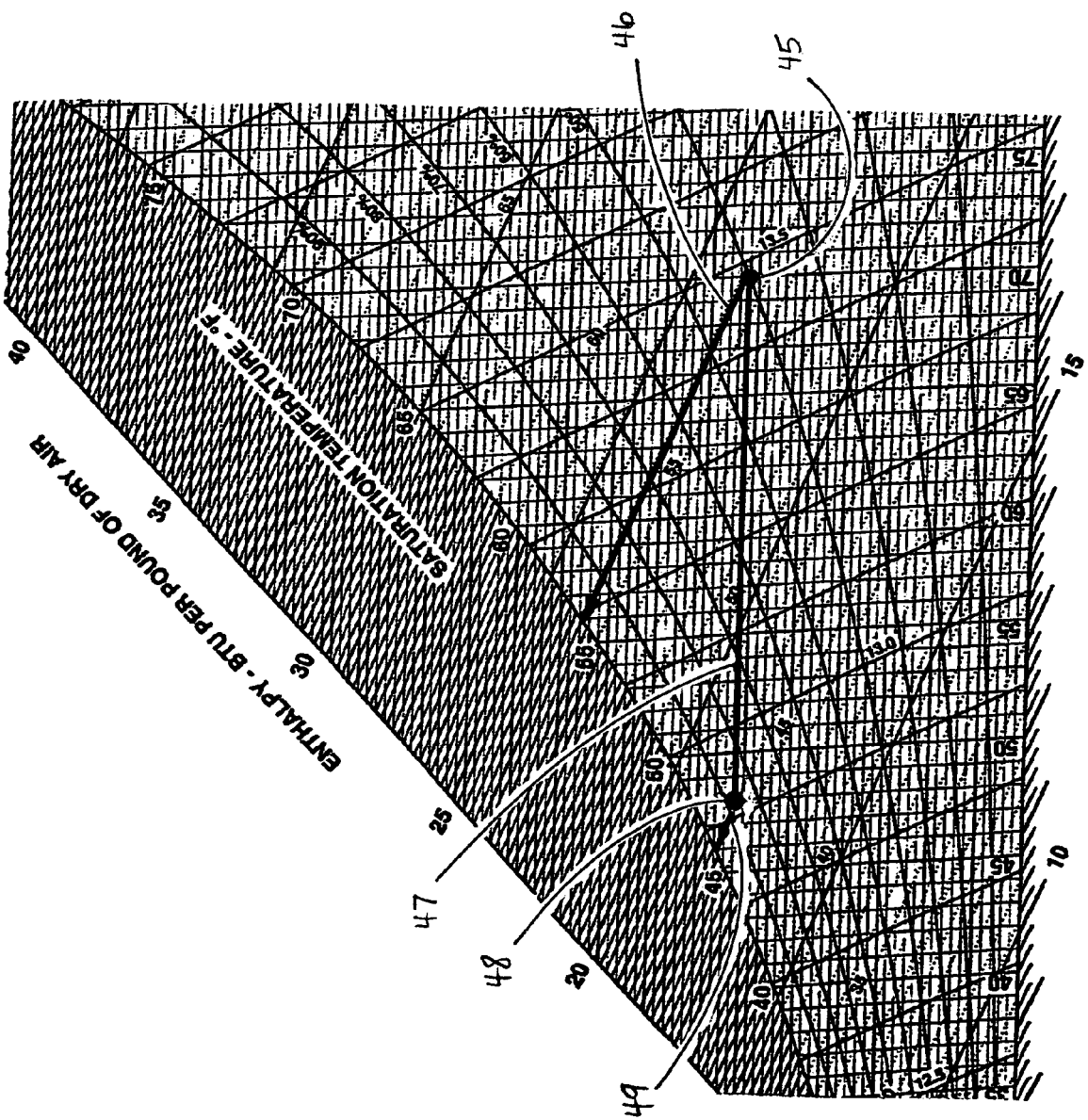
FIG. 9 is an example psychrometric chart illustrating the sensible cooling of air to lower the wet bulb temperature and dry bulb temperature toward the dew point temperature in accordance with the invention.

The FIG. 9 psychrometric chart illustrating the cooling of air without altering the moisture content (and dew point) of the air shows that prior to cooling the air it has a dry bulb temperature 45 of seventy degrees F., a wet bulb temperature 46 of fifty-six degrees F., and a dew point of forty-five degrees F. After the air is cooled, it has a dry bulb temperature 48 of forty-eight degrees F. and has a wet bulb temperature 49 of forty-six degrees F. The cooled air still has a dew point of forty-five degrees F. The wet bulb temperature is always less than the dry bulb temperature. While the benefits of getting closer to the dew point are clear significant benefits can be derived by partially moving in that direction. For example, there are benefits to be derived if the air were not cooled to a dry bulb temperature of forty-eight degrees F., but were cooled to only fifty-two degrees F. Such action would address one of the key issues in cooling tower design which is approach temperature or the difference between the cooling tower discharge and the wet bulb temperature. Those experienced in the industry know that the closer the approach temperature the more difficult it is to accomplish the design. In this regard, if one keeps the same cooler discharge temperature and lowers the wet bulb temperature design margin is gained in the original approach temperature and original heat exchanger approach temperature.

Dew point efficiency is the ratio of the difference between ambient air dry bulb temperature (one hundred five degrees F.) and the cooling tower 57 outlet water temperature (sixty nine degrees F.) or (thirty six degrees F.) divided by the ambient air dry bulb temperature (one hundred five degrees F.) minus the dew point temperature (sixty five degrees F.) or (forty degrees F.) which yields (thirty six/forty) or 90%.

Wet bulb efficiency is calculated in a similar manner but using the wet bulb temperature instead of the dew point. In this case we would have 105 F. minus 68.3 F. or 36.7 F. divided by 105 F. minus 76.6 F. or 28.4 F. for a wet bulb efficiency of 129%.

Figure 10:
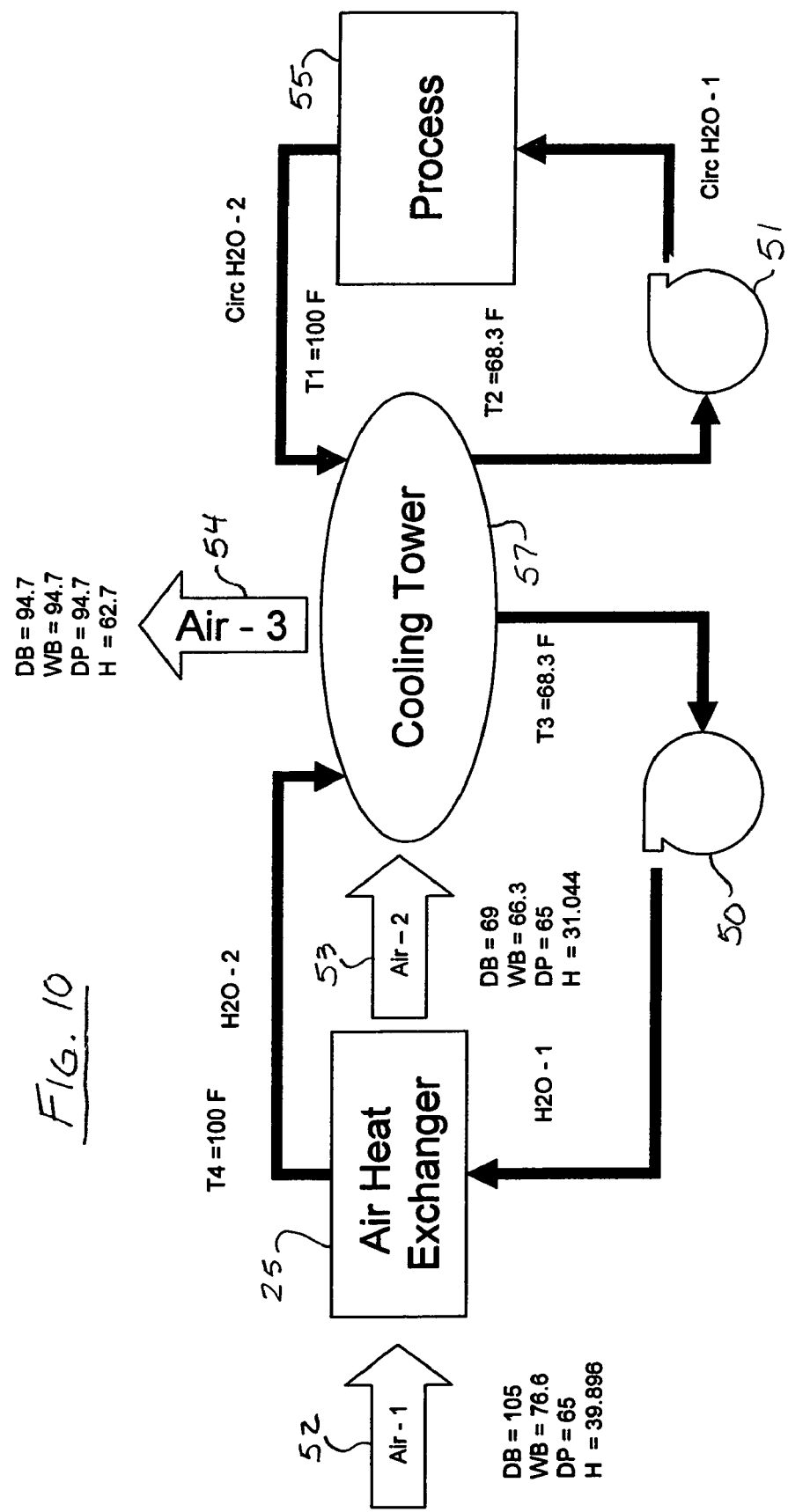
FIG. 10 is a process flow chart illustrating a combined cooling tower system constructed in accordance with the invention where the same tower elements are used for the process and heat exchange cooler.

In FIG. 10, pump 50 is an active component that provides the motive power to direct cooled water (68.3 degrees F.) from the cooling tower 57 through the members 10 in heat exchanger 25 and back to the cooling tower. Valves and controls for this system to regulate the rate of delivery of this water to the process being cooled can be as simple as a manual valve or orifice or as complex as a computerized flow control system with multiple temperature, pressure, and flow sensors and associated active flow control valves. Additional pumps, tanks, piping, valves, and controls are part of this system with the function of managing chemical treatment, and feed and bleed operations in order to limit scale formation and loss of heat exchange capacity. This function along with the associated technology and system design are well-established prior art. Heated water exiting heat exchanger 25 has a dry bulb temperature of one hundred degrees F. Ambient air 52 passing into heat exchanger 25 has a dry bulb (DB) temperature of one hundred and five degrees, a wet bulb (WB) temperature of 76.6 degrees F., a dew point (DP) of sixty-five degrees F., and an enthalpy (H) of 39.896. Heat exchanger 25 cools the ambient air 52 and produces air 53 having a dry bulb temperature of sixty-nine degrees F., a wet bulb temperature of sixty-six point three degrees F., a dew point of sixty-five degrees F., and an enthalpy (H) of 31.044. The ambient air 52 flows through heat exchanger 25 intermediate members 10 and is cooled without altering the dew point of the air. When air 53 passes through the cooling tower, heated moisture laden air 54 is produced and is discharged from the tower into the atmosphere. Air 54 has a dry bulb temperature of 94.7 degrees F., a wet bulb temperature of 94.7 degrees F., a dew point of 94.7 degrees F., and enthalpy (H) of 62.7. Pump 51 directs a portion of cooled water (68.3 degrees F.) from the cooling tower to a selected industrial or other process. Heated water (100 degrees F.) produced by process 55 is directed back to the cooling tower for cooling.

Figure 11:
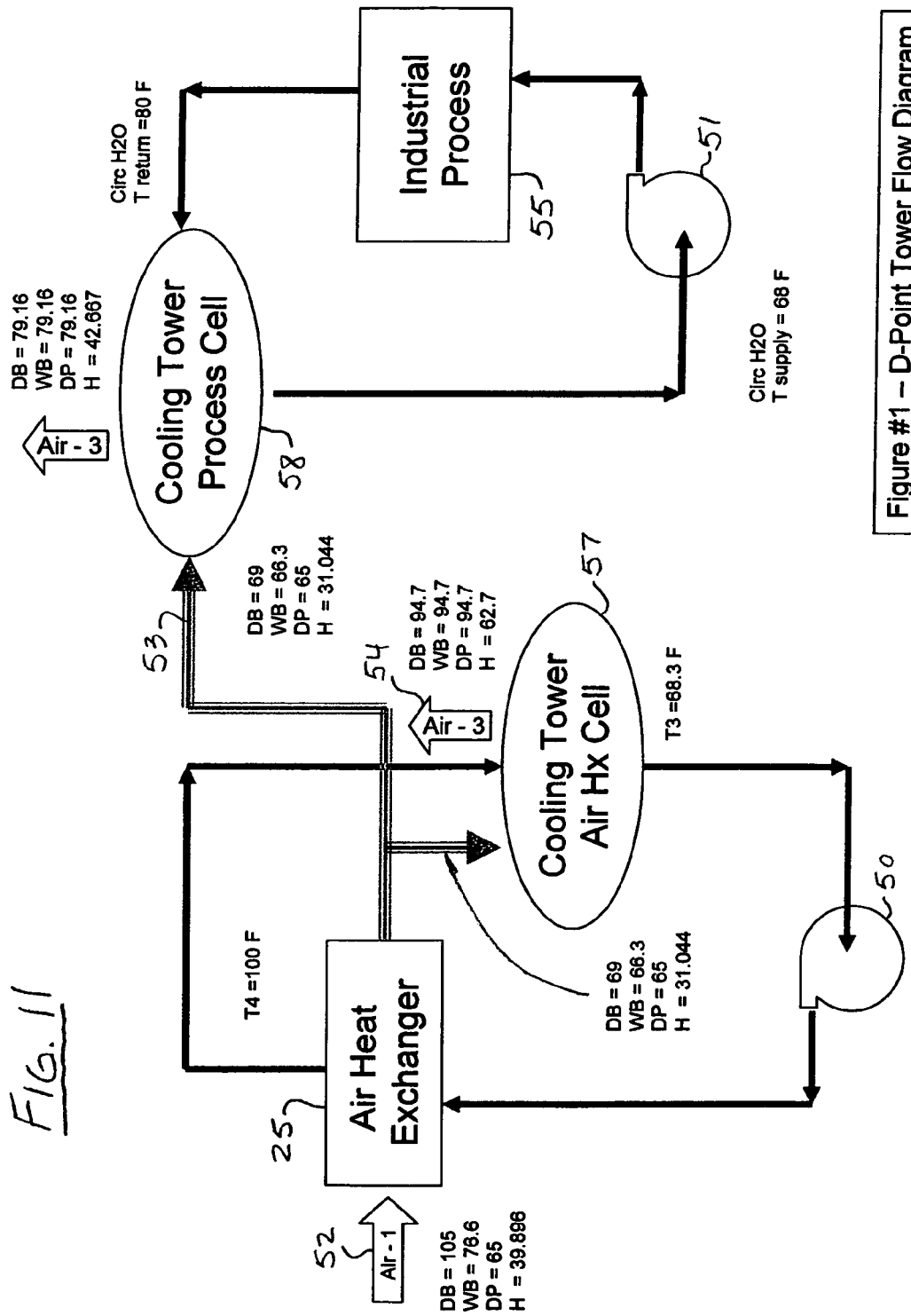
FIG. 11 is a process flow chart illustrating a split cooling tower system constructed in accordance with the invention where a separate tower cell is used to cool the inlet air for the process cooler and the heat exchange cooler; said separate tower cell being used as an example where the water return temperatures from process and heat exchanger are different.

FIG. 11 is a process flow diagram illustrating a cooling tower system similar to that described above in FIG. 10, except that cooling tower 57 is dedicated to providing cooled water for heat exchange 25 which has two sections one for cooling tower 57 and one for cooling tower 58 such that cooled air 53 from heat exchanger 25 supplies both the dedicated cooling tower 57 and the cooling tower 58 that provides cooled water for the industrial process 55. By splitting the cooling towers they can be designed for different approach temperatures and different return hot water temperatures maximizing performance and improving economics.

Figure 12:
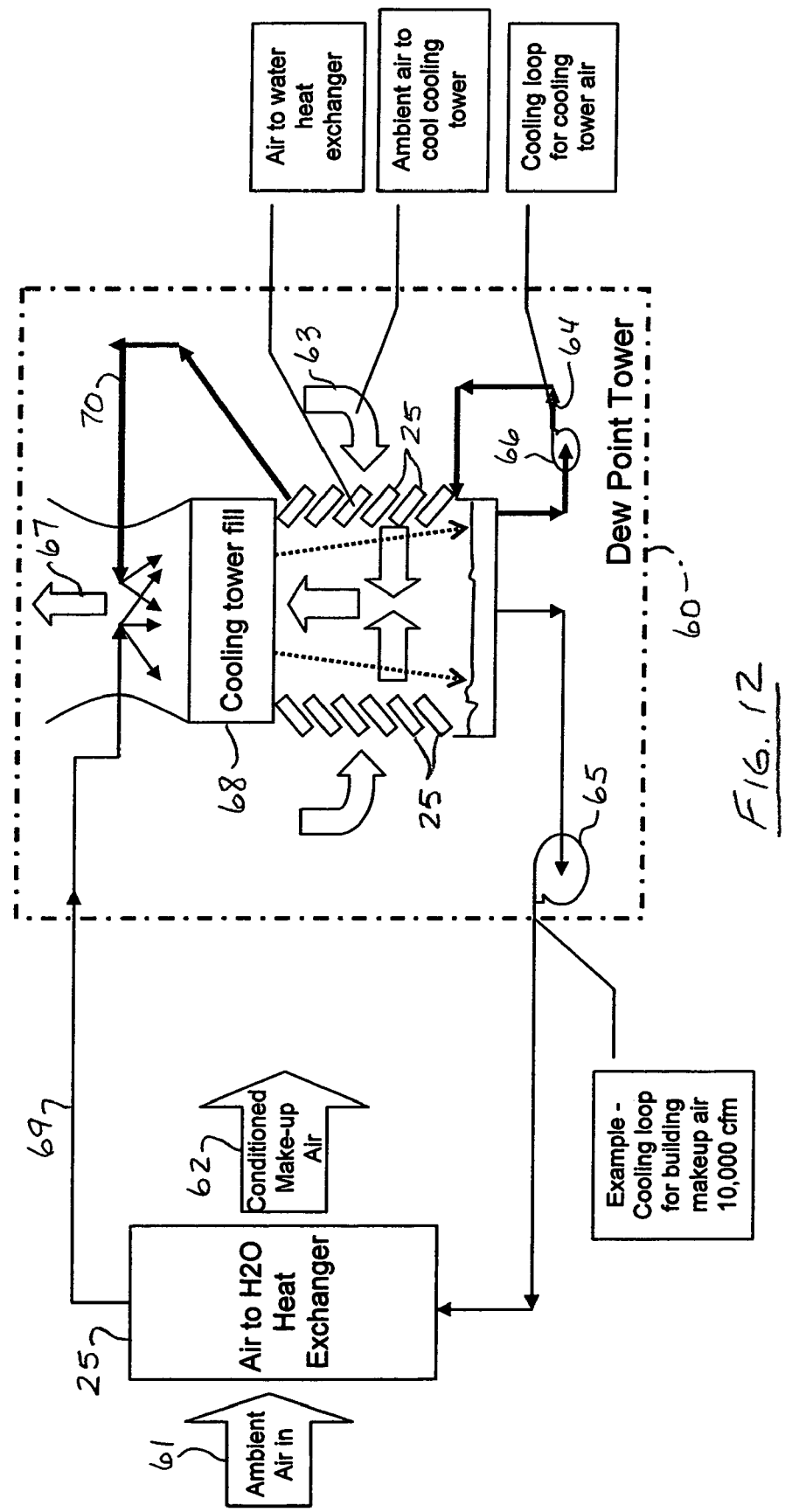
FIG. 12 is a process flow chart illustrating a further cooling tower system constructed in accordance with the invention.

FIG. 12 is a process flow diagram illustrating a cooling tower system in which heat exchanger 25 processes ambient air 61 and produces cooled makeup air for a building. Cooling tower 60 includes its own heat exchangers 25 that process ambient air and produce cooled air that is directed upwardly through fill 68 to cool water flowing downwardly through fill 68. Pump 65 directs cooled water from tower 60 through the make-up air heat exchanger 35 that cools ambient air 61 and then through conduit back to cooling tower 60. Pump 66 in cooling loop 64 directs cooled water from tower 60 through the heat exchangers 25 that cool ambient air 63 drawn or forced into tower 60. Heated water 70 from the cooling tower heat exchangers is directed back into fill 68 for cooling. Heated water 69 from the heat exchanger 25 that cools ambient air 61 is also directed back into fill 68 for cooling.

The approach temperature for a cooling tower is the difference between the temperature of the cooled water produced by the cooling tower and the ambient wet bulb temperature of air at the tower. For most processes, a small approach temperature is desirable as it typically improves efficiency and supports some threshold petrol-chemical conditions. A competing factor is the size of heat exchangers and cooling towers necessary to achieve close approach temperatures (typically two to three degrees). Although the approach temperature can vary depending on the process needs and value, in the practice of the dew point cooling tower of the invention, the approach temperature is also driven by the need to have a combination of cooling tower approach temperature and liquid to air heat exchanger coolant supply temperature that yield a viable cooling tower and heat exchanger size while also being equal to or less than the difference between the dry bulb and wet bulb temperatures at the exit of the cooling tower air inlet exchanger.

A cooling tower size and heat exchanger size are viable if both a cost effective tower and cost effective heat exchanger can be built. Driving this cost effectiveness is the behavior of a cooling tower where as the approach temperature is decreased both the water surface area and the time that the water surface area is exposed to air must be increased. This requires a greater amount of fill and that fill needs to have a greater surface area per unit of volume. As this fill goes up, the costs go up. To have a viable heat exchanger the terminal temperature differences must be such that the heat exchanger heat transfer area is not so large that the cost is too great. For example, we have surface areas in the range of 4,000 to 9,000 square feet for a 200,000 Btu heat load. Without the adhesively bonded heat exchanger described herein, the cost would likely be in the $10,000.00 plus range and if the required area doubled this cost would begin to be very out of balance with what would make sense.

As noted, the approach temperature must be equal to or less than the difference between the dry bulb and wet bulb temperatures at the exit of the heat exchanger that is providing inlet air to a cooling tower. The cooling tower works on the wet bulb temperature and the heat exchanger is the sensible cooler that cools the ambient air that delivers the air at the cooling tower inlet at a particular dry bulb (dependent on the dew point efficiency and the temperature difference of the heat exchanger and the inlet temperature to the heat exchanger is dependent on the approach temperature). In other words, the approach temperature determines the difference between the wet bulb and the water outlet temperature. Say we have a two degree approach temperature and a 66.3 degree wet bulb. The water out of the cooling tower is by definition 68.3 degrees which is the temperature of the water into the air heat exchanger. Assuming a 105 F dry bulb, a 65 F dew point, and a 76.6 F wet bulb, we need to cool the air to a dry bulb of 69 F, meaning that the heat exchanger must work with the terminal conditions of 68.3 F cooling water in and 69 F air out to achieve a 90% dew point tower. Looking next at an 85% dew point tower, we have a web bulb of 66.9 F and a two degree approach yields 68.9 F water out of the tower cooling air to 71 F. Notice how this difference between dry bulb and wet bulbs changes. Like water, heat will not flow up hill. Energy must move from higher temperatures to lower temperatures. Water evaporates to cool air and to cool water toward the wet bulb, with the wet bulb being the lowest possible temperature. The heat exchanger takes the water that is close to the wet bulb and sensibly cools the air without adding moisture such that the air outlet temperature approaches but can not go below the water temperature entering the heat exchanger. Since the amount of moisture in the air determines the difference.

Figure 13:
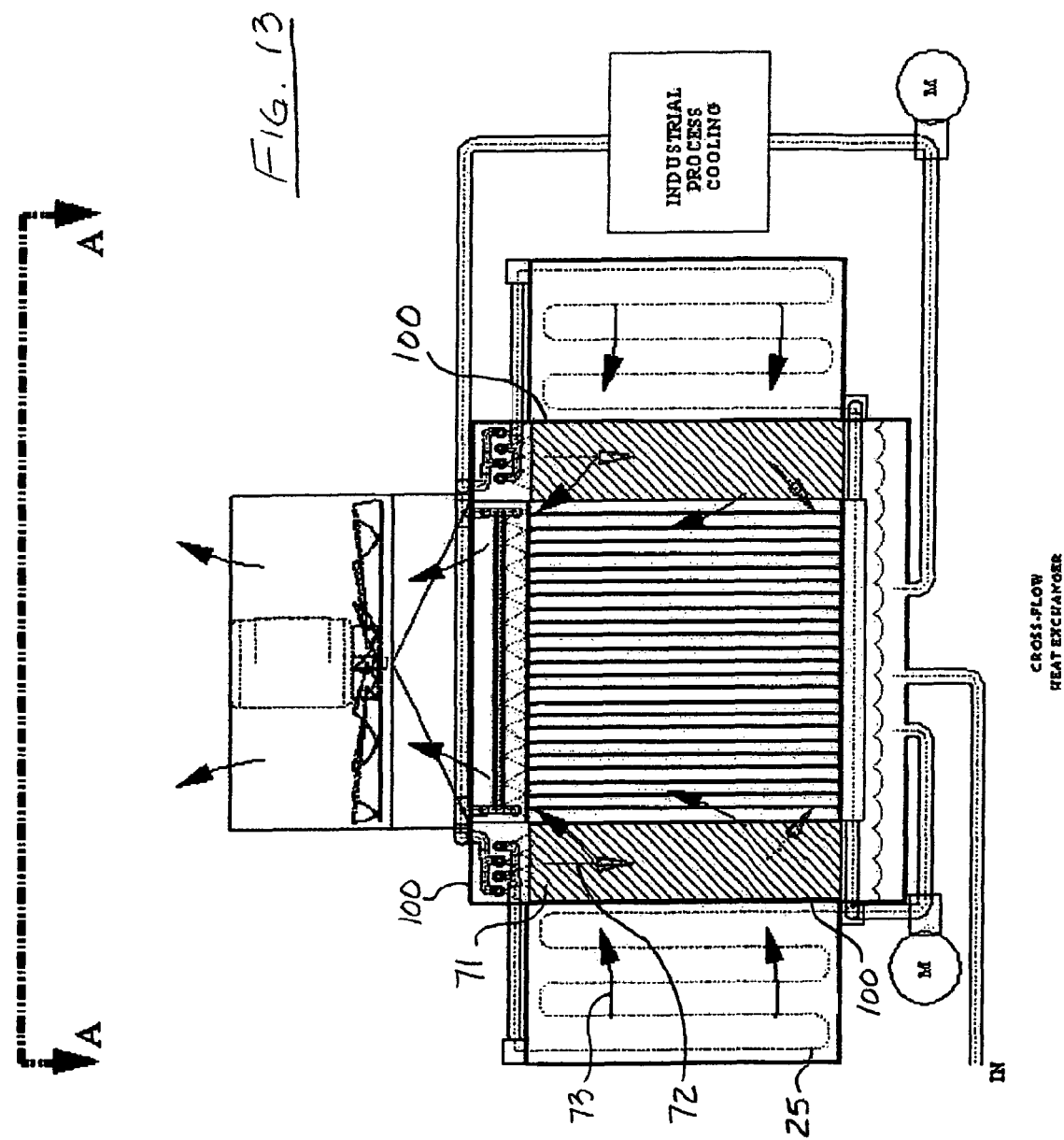
FIG. 13 is a side elevation view illustrating a cross-flow induced cooling tower incorporating the features of the invention.
Figure 14:
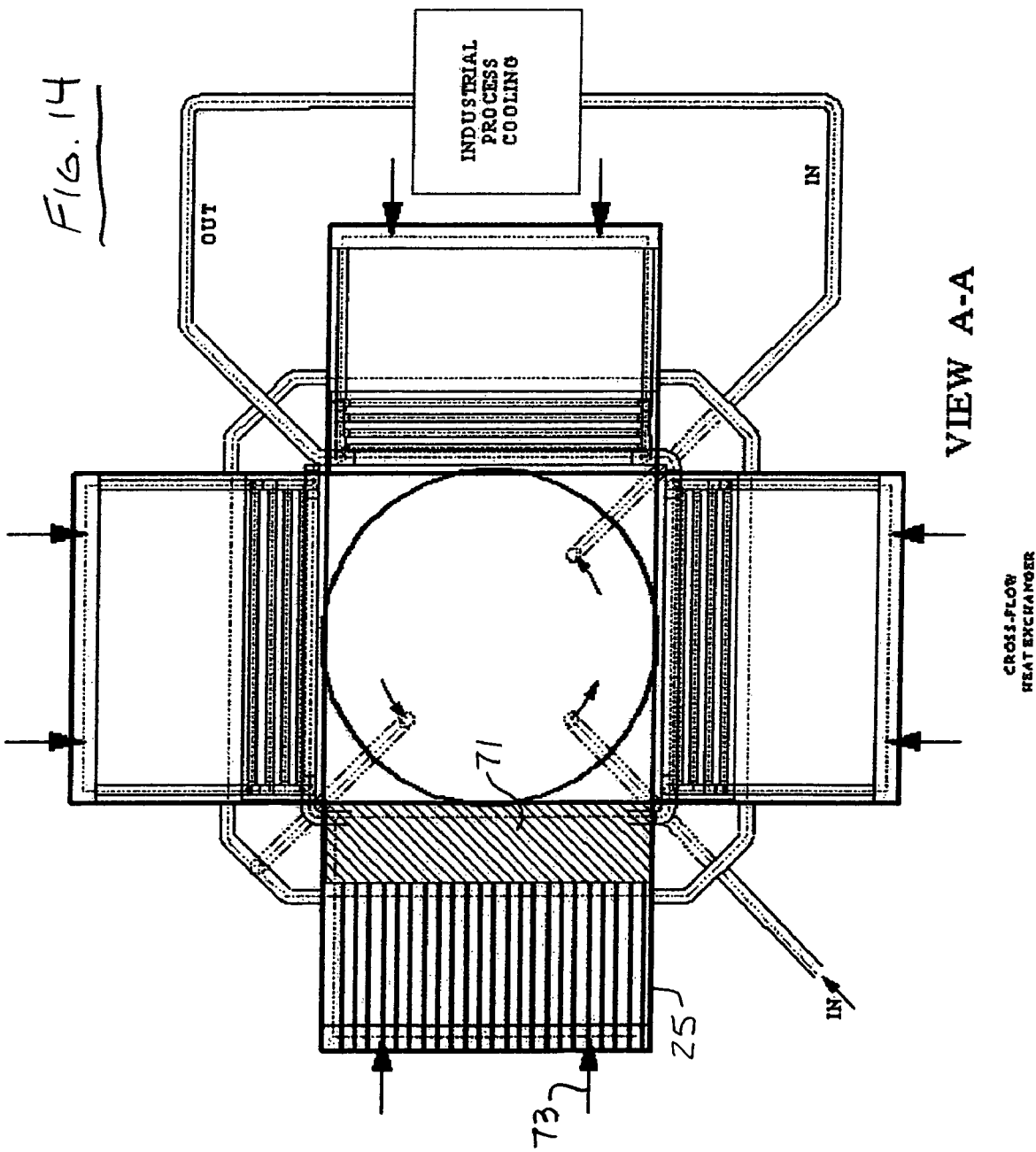
FIG. 14 is a top view further illustrating the cross-flow induced cooling tower with dew point cooling tower features of FIG. 13.

FIGS. 13 and 14 illustrate a general arrangement of an induced draft cross-flow cooling tower in which ambient air 73 is drawn through heat exchanger 25 to produce cooled air that flows transversely through fill 72 and then upwardly out through the top of the tower. Water 72 flows downwardly through fill 71 under gravity. The fairing or housing 100 of the tower not only guides the air flow through the tower in a way to minimize flow resistance and blower power but forms an air dam and a thermal barrier to segregate and preserve the conditions of the tower.

The fairing 100 forms an air dam by permitting the inflow of ambient air into the tower via the ambient air inlets of the heat exchanger(s), and, by otherwise preventing or minimizing the inflow of ambient air into the tower. The fairing can be caulked or otherwise sealed to minimize the inflow of ambient air into the tower at points other than the heat exchanger.

The fairing also forms a thermal barrier to minimize parasitic heat gain into the tower from the ambient air or due to sunlight and/or ambient air warming the fairing. Toward this end, the fairing can include fiberglass, foam or any other desired insulating material. Parasitic heat gain can negate at least in part the sensible cooling that has been achieved in the tower inlet air cooler.

The fairing design capability to seal and insulate a cooling tower is a particularly important embodiment of the dew point cooling tower of the invention.

Figure 15:
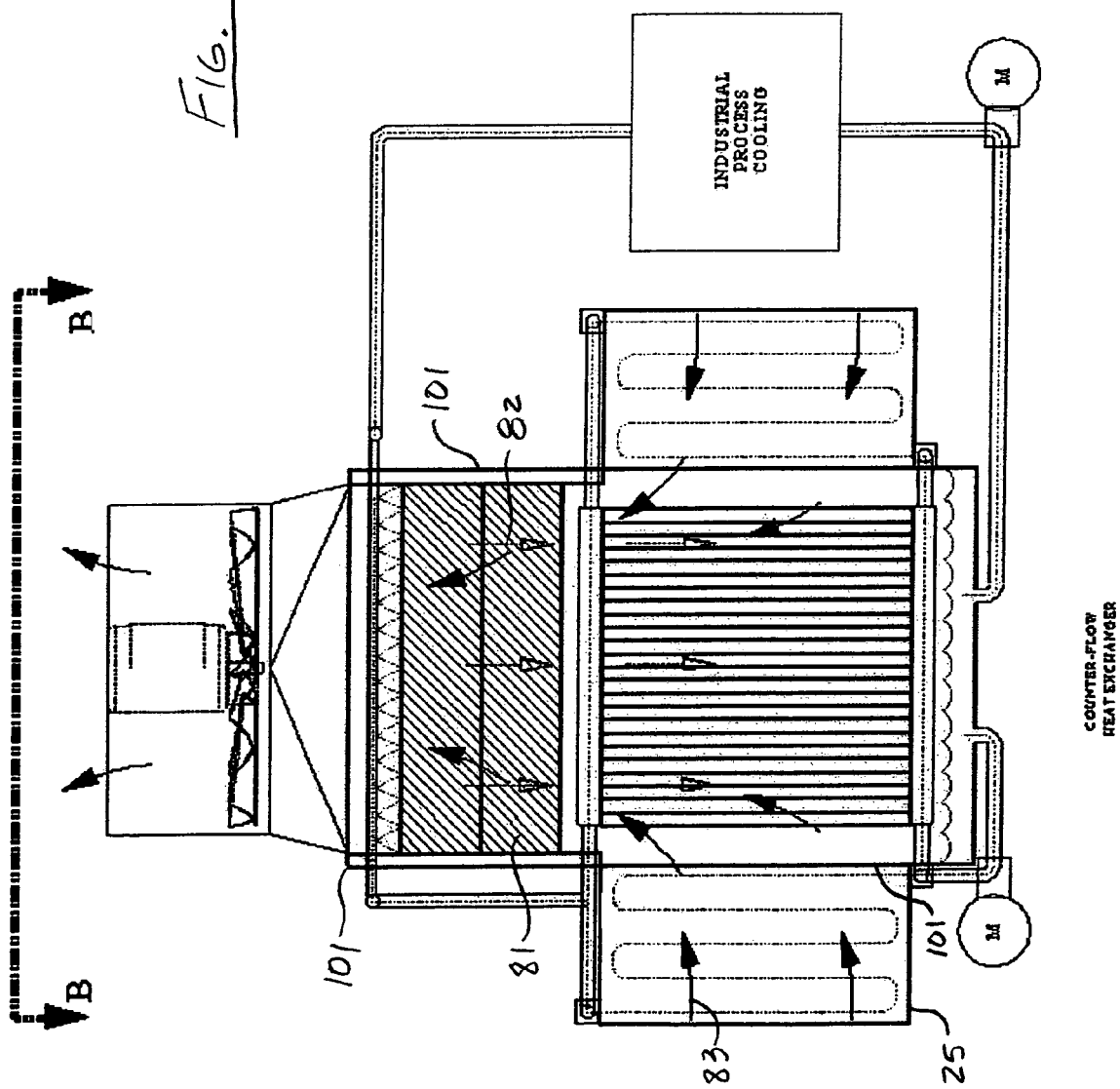
FIG. 15 is a side elevation view illustrating a counter-flow induced-draft cooling tower incorporating the features of the invention.
Figure 16:
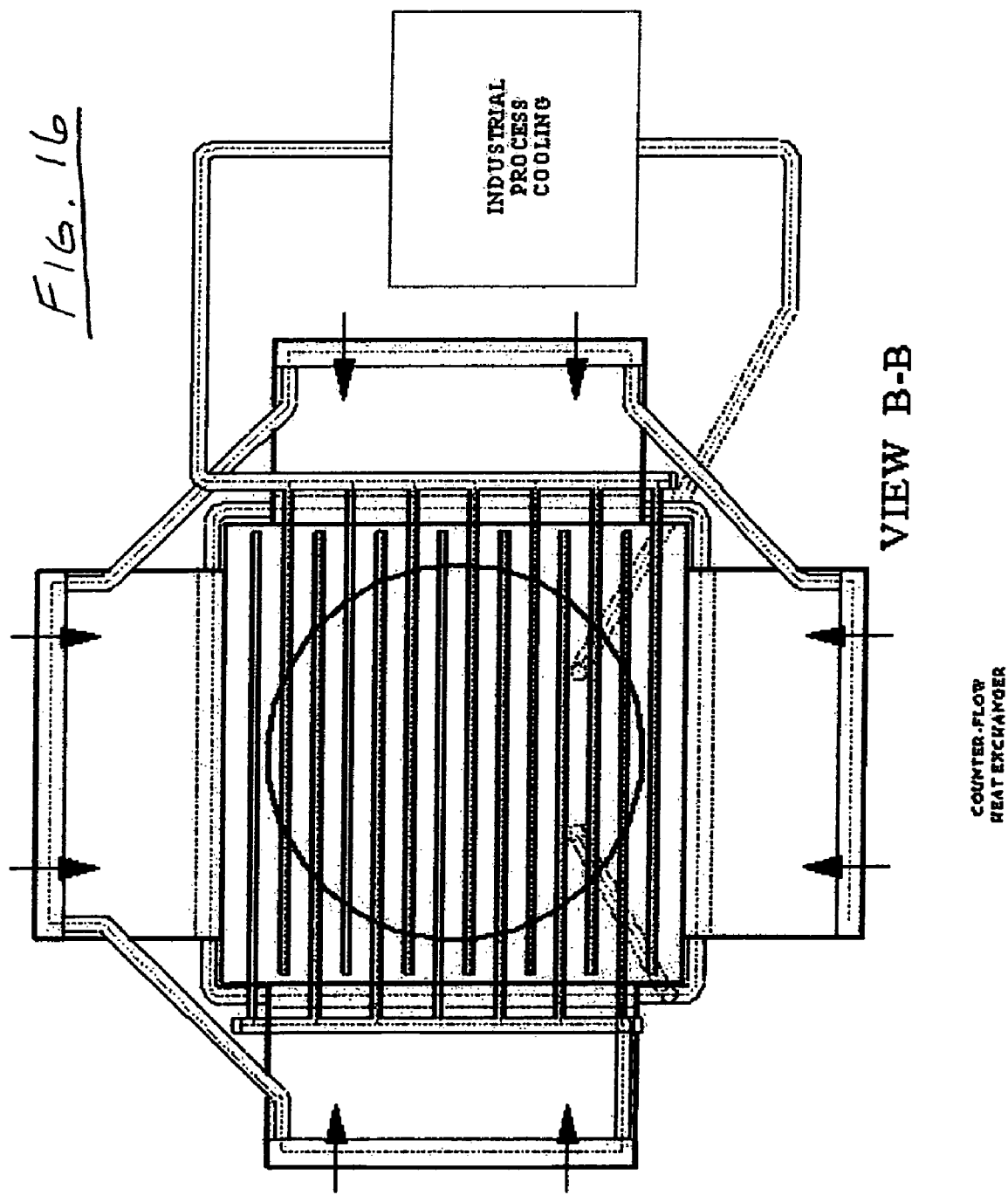
FIG. 16 is a top view illustrating the counter-flow induced-draft cooling tower with dew point cooling tower features of FIG. 15.
Figure 17:
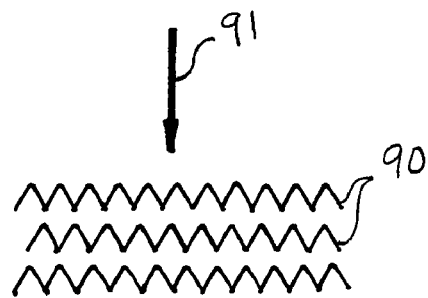
FIG. 17 is a diagram illustrating layered screens in one splash fill construction that can be utilized in a cooling tower.
Figure 18:
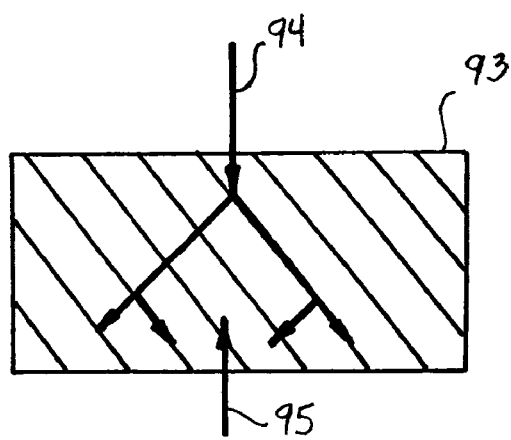
FIG. 18 is a diagram illustrating cross-corrugated film fill that can be utilized in a cooling tower; and, FIG. 19 is a diagram illustrating vertical film fill that can be utilized in a cooling tower.
Figure 19:
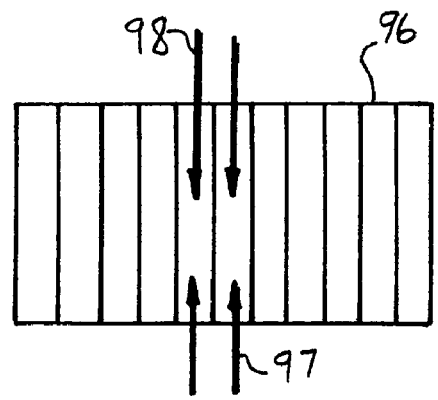

FIGS. 15 and 16 illustrate an induced draft counter-flow cooling tower in which ambient air 83 is drawn through heat exchanger 25 to produce cooled air that flows upwardly through fill 81 and then out into the atmosphere. Water 82 flows downwardly through fill 81. Similar to the cross-flow cooling tower, this structure is preferably, but not necessarily, caulked and sealed to achieve an airtight enclosure with insulation as necessary to avoid or minimize parasitic heat gain and the inflow of ambient air from the surroundings including sun load.

It is also desirable that the housing of the cooling tower be thermally insulated, both at the location at which the heat exchanger is integrated in or connected to the cooling tower and at remaining locations on the cooling tower housing. Such insulation is particularly desirable in portions of the housing that are located beneath and/or adjacent fill, and are less significant at points at which warm, humidified air is exiting the cooling tower. Double walls, foam insulation, or any other means can be utilized to insulate a cooling tower to minimize the effect of sun load and to seal the cooling tower to prevent or minimize the seepage of ambient air into the cooling tower.

The Tables I to X below at the end of the Specification were developed as scoping parametric analysis of operational scenarios for Heat Exchanger dew point efficiencies of 80%, 85%, 90%, and 95% assuming the dew point cooling tower is providing coolant to a hypothetical 10,000 cfm makeup air heat exchanger for a commercial office building. This particular case was selected as the basis for a parametric study since it has relevance to a significant market need for office buildings with one set of these particular buildings being located in the Phoenix, Ariz. area. Additionally this analysis is both scaleable and is representative of other applications and market needs. The set of scoping data itself is provided as indicating confirmation of principle and as being representative rather than limiting and finally as an information only scoping calculation rather than a final set of calculations.

Table I provides information concerning the air side of the air-to-water heat exchanger used in this make-up cooling system. The conditions in this table also provide relevant information for the cooling tower inlet air cooler except they must be modified to account for the different flow rate. In particular, it provides the characterizing attributes for the inlet and outlet air conditions for this heat exchanger and the associated dew point tower performance cases as identified by dew point and wet bulb efficiency. The dew point efficiency is defined as the difference between the inlet dry bulb and the heat exchanger outlet temperature divided by the difference between the inlet dry bulb and dew point temperature. Wet bulb efficiency is calculated in a similar manner by replacing the dew point temperature with wet bulb temperature. This can be seen by looking at the 80% case where 80% of the difference between the inlet ambient dry bulb temperature (105° F.) and the dew point (65° F.) is 32 degrees such that the heat exchanger outlet temperature would be 73° F. dry bulb to meet this case. The inlet ambient wet bulb temperature is 76.6 degrees F. The other characterizing attributes of the air for this case are: Wet Bulb temperature 67.57° F.; Dew Point temperature 65° F.; 32.028 BTU per pound enthalpy; 92.9 grains per pound moisture content (w); 13.53 cubic feet per pound specific volume of the mixture (v); 0.0739 air density in pounds per cubic foot (d); and 7.868 BTU per pound heat exchanger change in enthalpy from inlet to outlet (dh). The heat exchanger heat load in BTUs per hour for the 80% case is 329,040. The characteristics of the air for the other cases are shown in a similar manner in the table.

Table II provides starting point information for sizing the wet cooling tower. In particular, the information in Table I combined with the conditions in table II provides the design wet bulb temperature and the design coolant outlet temperature for the tower. Once again for the Heat Exchanger Dew Point (HXDP) 80% case we would use the 67.57° F. wet bulb temperature and the 2° F. approach yielding a 69.6° F. coolant temperature. Note that this yields a Cooling Tower Dew Point efficiency of 88.5% [(105–69.6)/105–65)] or [35.4/40] =88.5% A 3° F. approach yields a coolant temperature of 70.6° F. with the others following this pattern.

Table III provides inlet air heat exchanger water side flow information derived by using information from the previously described tables and the heat exchanger approach conditions and outlet temperature. In particular, continuing the 80% case and using the tower coolant outlet temperature of 69.6° F. associated with a 2 degree approach and the 100° F. heat exchanger water outlet temperature as shown in Table III, we can calculate the water flow rate for the make-up air heat exchanger. Namely, heat load (329,040 BTU/hr) is equal to the mass flow rate (m) times the specific heat of the fluid (water=1) times the temperature difference from inlet to outlet (100° F.–69.9° F.) or 30.1° F. yielding the very viable mass flow rate of 10,813 pounds per hour or 21.6 gallons per minute. Of course as the outlet temperature of the heat exchanger goes down the required flow rate through the heat exchanger goes up with all the cases shown being viable with reasonable pressure loss in the circuit. Also as the approach temperature goes up the ability to support low temperatures out of the water-to-air makeup heat exchanger diminish such that conditions for the high performance heat exchanger case (95% Dew Point) are not achievable even with the 2 degree approach temperature.

Tables IV provides the Log Mean Temperature Difference (LMTD) and square feet of heat exchange area for the makeup air heat exchanger assuming a conservative value of 10 BTU/hr/sq ft for heat transfer and using a adhesively bonded flat plate heat exchanger. The heat exchanger area increases as the degrees of approach are reduced and the temperature of the outlet water approaches the inlet air Dry Bulb temperature.

Table V provides design parameters of an induced mechanical draft counter flow cooling tower for the 80% case, two degree cooling tower approach temperature to the cooling tower inlet wet bulb and each of the water return temperatures being evaluated (100, 90, 85, and 80). In this table the first row is for atmospheric absolute pressure at the design location and sea level was chosen 14.7 pounds per square inch absolute (psia). The second and third row shows the cooling tower design air inlet conditions where the wet bulb is the same as we saw in Table I which was 67.6° F. and the dry bulb is 73° F. The next row is the return water temperature to the tower and varies from 100° F. to 80° F. An aggressive approach temperature of 2° F. was selected; a liquid to gas ratio of 0.5 to 0.7 was selected as they yield Merkel numbers or Tower Transfer Units number of 5 or less which indicate reasonable attributes for cooling tower design; the circulating water flow rate was from table III; a fan static head of 1.5 to 1.7 inches of water was used as representative for the tower fairing configuration and heat exchanger flow resistance; and a fan efficiency of 75% which is conservative was used. The Merkel number or number of transfer units is a unit-less number that indicates the size of the active heat transfer area of the tower and the general degree of difficulty associated with the design of a conventional wet cooling tower. The liquid (i.e., typically water) to gas (i.e., typically air) ratio is in the range of 0.25 to 2.5.

This number is calculated by the equation KAV/L=Me.

Where:
K=mass transfer coefficient (lb water/hr ft$^2$)
A=contact area/tower volume
V=active cooling volume/plan area
L=water rate (lb/h ft$^2$)

The transfer unit values of around 5 in the table reflect the close approach temperature, the selection of liquid to gas ratio near the optimum and indicate viable designs can be developed to satisfy the design conditions. The cooling tower outlet temperature (69.6° F.) is derived from the input data approach temperature. The temperature rise (30° F.) reflects the difference in temperature from cooling tower inlet (100° F.) to outlet (69.6° F.). Water evaporation rate (0.5 gpm) is the evaporation rate required to remove the heat not removed by conduction and convection. The latter two being associated with raising the temperature of the air from an inlet temperature of 73° F. to an exit temperature of 83.2° F. The heat rejected is the same as the input value as developed to cool the air in the air-to-water heat exchanger (328,640 Btu/hour). The dry air flow is about twice the water flow (21,600 pounds per hour) to achieve an air to water ratio of 0.5. The enthalpy of the cooling tower inlet air as determined during sizing analysis is (31.95 BTU/pound) and the enthalpy of the cooling tower outlet air is (47.165 BTU/pound). The specific volume of the exit air is 14.224 cubic feet per pound. The saturated exit air flow is 5,121 cfm. The cooling tower fan horsepower necessary to move this air is 1.6 Hp. With 0.259 pumping horsepower required to circulate the water through the tower.

Table VI takes the information generated through the sizing of the cooling tower for the 80% Dew Point building makeup air heat exchanger and both sizes and characterizes the heat exchanger to cool the inlet air for this cooling tower. The results are organized by return water temperature with 100° F. being the first set of data. Under this case the Air Flow through the heat exchanger is documented (Note that this is the same as the Dry Air Flow in table V). Next is Air Flow in cfm which is the inlet air flow calculated using the specific volume at the cooling tower inlet. The remaining inlet conditions are those from Table I except for heat load which is calculated from the air flow rate and change in enthalpy. This heat load is put in perspective by comparing it to the base cooling tower heat load associated with cooling the building inlet makeup air. Face area is calculated to provide a perspective of the open area needed to move the air flow at 1500 feet per minute. The assumed flat plate heat exchanger heat transfer coefficient is identified. The water side conditions are identified—Inlet temperature, outlet temperature, flow rate in pounds per hour and gallons per minute. The Log Mean Temperature Difference is identified and the square feet of surface area calculated. A plate height and width is calculated along with an area per plate and number of plates.

The remaining Tables VII to X provide values for additional Heat Exchange Dew Point Tower efficiencies. Note that the efficiency of the heat exchanger has been used as the basis for these calculations since this is the component of the system that would be driving this particular application process efficiency.

A dew point cooling tower of the type described herein with an air-to-water heat exchanger 25 provides the ability to cool—without adding moisture—the inlet air for a gas turbine below temperatures currently attainable. This could improve the performance of a gas turbine by up to fifteen percent or more.

Converting a cooling tower to a dew point tower of the type described herein provides the ability to increase the power output of a power plant without changing the heat source design such as the fossil plant/nuclear plant boiler and with limited changes to the balance of plant and power transmission system. This would improve the efficiency of plant operation and provide increased generating capacity at a much lower cost per installed kilowatt than found at even the most competitive power plant.

Utilizing a dew point cooling tower to precondition air for office buildings, nursing homes, hospitals, research laboratories, stores, school, movie theaters, etc. likely would pay for itself in less than one year in areas where the dew point does not normally exceed sixty-five degrees F.

A dew point cooling tower of the type described herein can be utilized to supply cool water to an air-to-water heat exchanger that is used to cool air entering a manufacturing facility, office building, or residence.

The dew point cooling tower described herein enables the utilization of an ultimate heat sink temperature that is below the ambient wet bulb temperature and close to the dew point. This enables the efficiency of many industrial processes to be improved. One reason for the effectiveness of the dew point cooling tower of the invention is the utilization of sensibly cooled air. Air from an evaporative cooler is not preferred in the invention and tends to defeat the purpose of the invention by injecting additional water into the air. Systems like those set forth in U.S. Pat. No. 6,854,278 that suggest directing large volumes of humidified air into a cooling tower seem at odds with the basic purpose of a cooling tower, which is to humidify air as it passes through the tower in order to cool a liquid also passing through the tower. Since there are no calculations or specific examples in U.S. Pat. No. 6,954,278, it is difficult to determine how the heat exchanger-evaporative cooler unit described in the patent will in any configuration operate in conjunction with a cooling tower. The adhesive bonded heat exchanger of the invention facilitates the invention because it produces only sensibly cooled air, because it does not consume energy by requiring sudden changes of direction in the air path and by cannibalizing air from the dry side of a plate to move along the wet side of the plate, because it does not require alternating dry and wet channels, and because it leaves the cooling of water in the province of the cooling tower. Cooling tower fill does not utilize dry channels. Water passes through fill in which water is in droplet or sheet form.

The adhesive bonded heat exchanger described herein enables fabrication of heat exchangers that efficiently and effectively transfer heat between fluids with significantly different attributes driving the need accommodate different volumetric flow rates.

The adhesive bonded heat exchanger described herein is fabricated in manner that yields high heat transfer surface with minimum material and manufacturing resource such that the cost of heat exchange between various fluids (even those of comparable volumetric flow) can be reduced.

The adhesive bonded heat exchanger fits numerous applications both with and independent of the dew point tower. Some integrated examples include: Gas turbine inlet air cooling (both the tower heat exchanger and the turbine inlet air heat exchanger); office, manufacturing facility, hospital, residential, and other building air cooling (both the tower heat exchanger and the building inlet air heat exchanger, and recirculating air heat exchangers); petrol-chemical process heat exchangers; electrical power plant heat exchangers; and other heat transfer applications where differences in volumetric flow drive design features.

TABLE I

Air Side - Air to water heat exchanger to condition makeup air

| | Inlet Conditions | | Air Heat Exchanger Outlet Conditions | | |
|---|---|---|---|---|---|
| DP Efficiency | | 80% | 85% | 90% | 95% |
| WB Efficiency | | 113% | 120% | 127% | 134% |
| DB | 105 | 73 | 71 | 69 | 67 |
| WB | 76.6 | 67.57 | 66.94 | 66.302 | 65.655 |
| DP | 65 | 65 | 65 | 65 | 65 |
| enthalpy | 39.896 | 32.028 | 31.536 | 31.044 | 30.552 |
| w | 92.9 | 92.9 | 92.9 | 92.9 | 92.9 |
| v | 14.35 | 13.53 | 13.48 | 13.42 | 13.37 |
| d | 0.0697 | 0.0739 | 0.0742 | 0.0745 | 0.0748 |
| dh | | 7.868 | 8.36 | 8.852 | 9.344 |
| Air Side Heat Load BTU/hr | 10,000 cfm 41,820 #/hr | 329,040 | 349,620 | 370,190 | 390,770 |

TABLE II

Dew point tower design conditions

| CT Outlet Temp | Approach | 80% DP efficiency | 85% DP efficiency | 90% DP efficiency | 95% DP efficiency |
|---|---|---|---|---|---|
| 2 F. Approach | 2 | 69.6 | 68.9 | 68.3 | NA |
| 3 F. Approach | 3 | 70.6 | 69.9 | NA | NA |
| 4 F. Approach | 4 | 71.6 | 70.9 | NA | NA |
| 5 F. Approach | 5 | 72.6 | NA | NA | NA |

NA—this signifies that the desired dew point efficiency cannot be achieved with this approach temperature

TABLE III

Water Side - Air to water heat exchanger to condition makeup air

| Mass Flow Rate | Hx Outlet Temp | 73 #/hr | 73 gpm | 71 #/hr | 71 gpm | 69 #/hr | 69 gpm | 67 #/hr | 67 gpm |
|---|---|---|---|---|---|---|---|---|---|
| *Cooler Outlet DB Condition* | | | | | | | | | |
| 2 degree Approach | 100 | 10,813.0 | 21.62 | 11,256.3 | 22.50 | 11,678.7 | 23.35 | NA | NA |
|  | 90 | 16,105.7 | 32.20 | 16,601.1 | 33.19 | 17,061.0 | 34.11 | NA | NA |
|  | 85 | 21,324.7 | 42.63 | 21,769.6 | 43.52 | 22,169.7 | 44.32 | NA | NA |
|  | 80 | 31,547.5 | 63.07 | 31,611.2 | 63.20 | 31,645.6 | 63.26 | NA | NA |
| *Cooler Outlet Condition* | | | | | | | | | |
| 3 degree Approach | 100 | 11,180.4 | 22.35 | 11,630.7 | 23.25 | NA | NA | NA | NA |
|  | 90 | 16,934.6 | 33.86 | 17,428.7 | 34.84 | NA | NA | NA | NA |
|  | 85 | 22,802.5 | 45.59 | 23,215.1 | 46.41 | NA | NA | NA | NA |
|  | 80 | 34,892.9 | 69.76 | 34,753.5 | 69.48 | NA | NA | NA | NA |
| 4 degree Approach | 100 | 11,573.7 | 23.14 | 12,031.0 | 24.05 | NA | NA | NA | NA |
|  | 90 | 17,853.5 | 35.69 | 18,343.1 | 36.67 | NA | NA | NA | NA |
|  | 85 | 24,500.4 | 48.98 | 24,866.3 | 49.71 | NA | NA | NA | NA |
|  | 80 | 39,032.0 | 78.03 | 38,589.4 | 77.15 | NA | NA | NA | NA |
| 5 degree Approach | 100 | 11,995.6 | 23.98 | NA | NA | NA | NA | NA | NA |
|  | 90 | 18,877.8 | 37.74 | NA | NA | NA | NA | NA | NA |
|  | 85 | 26,471.4 | 52.92 | NA | NA | NA | NA | NA | NA |
|  | 80 | 44,285.3 | 88.53 | NA | NA | NA | NA | NA | NA |

NA—this signifies that the selected dew point efficiency cannot be achieved with this selected approach temperature

TABLE IV

Heat Exchange Area - Air to water heat exchanger to condition makeup air

|  |  | LMTD | Sq Ft Area | LMTD | Sq Ft Area | LMTD | Sq Ft Area | LMTD | Sq Ft Area |
|---|---|---|---|---|---|---|---|---|---|
| 2 degree CT Approach | 100 | 4.2 | 7,899 | 3.3 | 10,545 | 2.2 | 17,885 | NA | NA |
|  | 90 | 7.8 | 4,196 | 6.5 | 5,364 | 4.7 | 8,381 | NA | NA |
|  | 85 | 9.4 | 3,501 | 7.9 | 4,430 | 5.8 | 6,793 | NA | NA |
|  | 80 | 10.9 | 3,030 | 9.2 | 3,804 | 6.8 | 5,754 | NA | NA |
| Hx Outlet Temp | 100 | 3.6 | 9,238 | 2.5 | 13,764 | NA | NA | NA | NA |
| 3 degree CT Approach | 90 | 6.9 | 4,765 | 5.3 | 6,646 | NA | NA | NA | NA |
|  | 85 | 8.3 | 3,947 | 6.4 | 5,422 | NA | NA | NA | NA |
|  | 80 | 9.7 | 3,398 | 7.6 | 4,616 | NA | NA | NA | NA |
| Hx Outlet Temp | 100 | 2.9 | 11,537 | 1.1 | 31,302 | NA | NA | NA | NA |
| 4 degree CT Approach | 90 | 5.8 | 5,699 | 2.7 | 12,921 | NA | NA | NA | NA |
|  | 85 | 7.0 | 4,674 | 3.4 | 10,186 | NA | NA | NA | NA |
|  | 80 | 8.2 | 3,994 | 4.1 | 8,456 | NA | NA | NA | NA |
| Hx Outlet Temp | 100 | 1.9 | 17,665 | NA | NA | NA | NA | NA | NA |
| 5 degree CT Approach | 90 | 4.1 | 8,022 | NA | NA | NA | NA | NA | NA |
|  | 85 | 5.1 | 6,456 | NA | NA | NA | NA | NA | NA |
|  | 80 | 6.0 | 5,441 | NA | NA | NA | NA | NA | NA |

TABLE V

Cooling Tower Design Parameters to Cool Building Makeup Air Heat Exchanger Only

80 Percent Dew Point Efficient Heat Exchanger - 2 F. approach Tower

| Inputs |  |  |  |  |
|---|---|---|---|---|
| Atmos Press (psia) | 14.7 | 14.7 | 14.7 | 14.7 |
| WB | 67.57 | 67.57 | 67.57 | 67.57 |
| DB | 73 | 73 | 73 | 73 |
| Hot water Temp | 100 | 90 | 85 | 80 |
| Approach | 2 | 2 | 2 | 2 |
| Liquid/gas Ratio | 0.6 | 0.63 | 0.7 | 1 |
| Circ Water Flow gpm | 21.62 | 32.20 | 42.63 | 63.07 |
| Fan Static Head | 1.5 | 1.5 | 1.5 | 1.5 |
| Fan Efficiency | 75 | 75 | 75 | 75 |

TABLE V-continued

Cooling Tower Design Parameters to Cool
Building Makeup Air Heat Exchanger Only

80 Percent Dew Point Efficient Heat Exchanger - 2
F. approach Tower

Output

| | | | | |
|---|---|---|---|---|
| Tower - Dew Point Eff | 89% | 89% | 89% | 89% |
| # Transfer Units (Merkel #) | 4.8 | 5.1 | 5.1 | 5.1 |
| Cooling Tower Output Temp | 69.6 | 69.57 | 69.57 | 69.57 |
| Temp Rise (Thot - Tcold) | 30 | 20.4 | 15.43 | 10.43 |
| Water Evap Rate (gpm) | 0.5 | 0.51 | 0.51 | 0.53 |
| Exit Air Temp Sat (F.) | 83.2 | 81.16 | 79.3 | 77.1 |
| Heat Rejected (BTU/hr) | 328,640 | 328,920 | 328,660 | 328,910 |
| Dry Air Flow (#/hr) | 21,600 | 25,556 | 30,429 | 38,457 |
| Enthalpy Air In | 31.95 | 31.95 | 31.95 | 31.95 |
| Enthalpy Air out | 47.165 | 44.821 | 42.75 | 40.5 |
| Specific Vol Exit Air (cf/lb) | 14.224 | 14.134 | 14.05 | 14.5 |
| Sat exit air flow (cfm) | 5,121 | 6,010 | 7,126 | 8,949 |
| Approx Fan (hp) | 1.600 | 1.900 | 2.2 | 2.8 |
| Approx Pump (hp) | 0.259 | 0.380 | 0.51 | 0.75 |

TABLE VI

Cooling Tower Heat Exchanger Sizing information 80%
Cooling Tower Air Inlet Plate Hx Design Parameters*

| Terminal Conditions | 100 F. Case | 90 F. Case | 85 F. Case | 80 F. Case |
|---|---|---|---|---|
| Air Flow #/hr | 21,600 | 25,556 | 30,429 | 38,457 |
| Air Flow cfm | 5,165 | 5,764 | 6,835 | 8,603 |
| Air Dry Bulb In | 105 | 105 | 105 | 105 |
| Air enthalpy in | 39.9 | 39.9 | 39.9 | 39.9 |
| Air Dry Bulb Out | 73 | 73 | 73 | 73 |
| Air enthalpy out | 32.0 | 32.0 | 32.0 | 32.0 |
| Heat Load Q | 169,949 | 201,075 | 239,415 | 302,580 |
| % of Tower Base load | 52% | 61% | 73% | 92% |
| Face Area @ 1500 fpm | 4.6 | 5.1 | 6.1 | 7.6 |
| #/sec - sq ft | 1.7 | 1.8 | 1.9 | 1.9 |
| U heat transfer coeff | 10.0 | 10.0 | 10.0 | 10.0 |
| H2O inlet temp | 69.6 | 69.6 | 69.6 | 69.6 |
| H2O outlet temp | 100.0 | 90.0 | 85.0 | 80.0 |
| Water flow #/hr | 5,665 | 6,702 | 7,981 | 10,086 |
| Water flow gpm | 11.3 | 13.4 | 16.0 | 20.2 |
| LMTD | 4.2 | 7.8 | 9.4 | 10.9 |
| Area sq ft | 4,080 | 2,564 | 2,548 | 2,786 |
| Plate height | 1.0 | 2.0 | 2.0 | 2.0 |
| Plate length | 5.0 | 3.0 | 3.0 | 4.0 |
| Area per Plate | 5 | 6 | 6 | 8 |
| # plates | 816 | 427 | 425 | 348 |
| plate line length (in) | 408 | 214 | 212 | 174 |
| Hx length (ft) | 34.00 | 17.81 | 17.69 | 14.51 |
| gpm per plate | 0.014 | 0.031 | 0.038 | 0.058 |

TABLE VII

85 Percent Dew Point Efficient HX 2 F. approach
Tower

Inputs

| | | | | |
|---|---|---|---|---|
| Atmos Press (psia) | 14.7 | 14.7 | 14.7 | 14.7 |
| WB | 66.94 | 66.94 | 66.94 | 66.94 |
| DB | 71 | 71 | 71 | 71 |
| Hot water Temp | 100 | 90 | 85 | 80 |
| Approach | 2 | 2 | 2 | 2 |
| Liquid/gas Ratio | 0.55 | 0.6 | 0.65 | 0.78 |
| Circ Water Flow gpm | 22.5 | 33 | 43.5 | 63.2 |
| Fan Static Head | 1.6 | 1.6 | 1.6 | 1.6 |
| Fan Efficiency | 75 | 75 | 75 | 75 |

TABLE VII-continued

| | 85 Percent Dew Point Efficient HX 2 F. approach Tower | | | |
|---|---|---|---|---|

Output

| | | | | |
|---|---|---|---|---|
| Tower - Dew Point Eff | 91% | 91% | 91% | 91% |
| # Transfer Units (Merkel #) | 5.3 | 5.1 | 4.9 | 5.04 |
| Cooling Tower Output Temp | 68.94 | 68.94 | 68.9 | 68.94 |
| Temp Rise (Thot - Tcold) | 31.06 | 21 | 16 | 11.06 |
| Water Evap Rate (gpm) | 0.51 | 0.51 | 0.53 | 0.54 |
| Exit Air Temp Sat (F.) | 84.39 | 80.5 | 78.4 | 76.6 |
| Heat Rejected (BTU/hr) | 349,420 | 347,496 | 349,300 | 349,500 |
| Dry Air Flow (#/hr) | 20,455 | 27,500 | 33,462 | 31,459 |
| Enthalpy Air In | 31.5 | 31.5 | 31.5 | 31.5 |
| Enthalpy Air out | 48.5 | 44.1 | 41.9 | 40.0 |
| Specific Vol Exit Air (cf/lb) | 14.3 | 14.1 | 14.0 | 13.9 |
| Sat exit air flow (cfm) | 4,867 | 6,464 | 7,818 | 9,415 |
| Approx Fan (hp) | 1.50 | 2.17 | 2.60 | 3.10 |
| Approx Pump (hp) | 0.27 | 0.39 | 0.52 | 0.75 |

TABLE VIII

| | 85% Cooling Tower Air Inlet Plate Hx Design Parameters* | | | |
|---|---|---|---|---|
| Terminal Conditions | 100 F. Case | 90 F. Case | 85 F. Case | 80 F. Case |
| Air Flow #/hr | 20,455 | 27,500 | 33,462 | 31,459 |
| Air Flow cfm | 4,891 | 6,202 | 7,516 | 7,038 |
| Air Dry Bulb In | 105 | 105 | 105 | 105 |
| Air enthalpy in | 39.9 | 39.9 | 39.9 | 39.9 |
| Air Dry Bulb Out | 71 | 71 | 71 | 71 |
| Air enthalpy out | 31.5 | 31.5 | 31.5 | 31.5 |
| Heat Load Q | 172,558 | 231,990 | 282,285 | 265,388 |
| % of Tower Base load | 49% | 67% | 81% | 76% |
| Face Area @ 500 fpm | 13.0 | 16.5 | 20.0 | 18.8 |
| #/sec - sq ft | 0.6 | 0.6 | 0.6 | 0.6 |
| U heat transfer coeff | 10.0 | 10.0 | 10.0 | 10.0 |
| H2O inlet temp | 68.9 | 68.9 | 68.9 | 68.9 |
| H2O outlet temp | 100.0 | 90.0 | 85.0 | 80.0 |
| Water flow #/hr | 5,752 | 7,733 | 9,410 | 8,846 |
| Water flow gpm | 11.5 | 15.5 | 18.8 | 17.7 |
| LMTD | 3.3 | 6.5 | 7.9 | 9.2 |
| Area sq ft | 5,205 | 3,559 | 3,577 | 2,888 |
| Plate height | 2.0 | 2.0 | 2.0 | 2.0 |
| Plate length | 7.0 | 8.0 | 3.0 | 9.0 |
| Area per Plate | 14 | 16 | 6 | 18 |
| # plates | 372 | 222 | 596 | 160 |
| plate line length (in) | 186 | 111 | 298 | 80 |
| Hx length (ft) | 15.49 | 9.27 | 24.84 | 6.68 |
| gpm per plate | 0.031 | 0.070 | 0.032 | 0.110 |

TABLE IX

| | 90 Percent Dew Point Efficient HX 2 F. approach Tower | | | |
|---|---|---|---|---|

Inputs

| | | | | |
|---|---|---|---|---|
| Atmos Press (psia) | 14.7 | 14.7 | 14.7 | 14.7 |
| WB | 66.3 | 66.3 | 66.3 | 66.3 |
| DB | 69 | 69 | 69 | 69 |
| Hot water Temp | 100 | 90 | 85 | 80 |
| Approach | 2 | 2 | 2 | 2 |
| Liquid/gas Ratio | 0.5 | 0.57 | 0.65 | 0.75 |
| Circ Water Flow gpm | 23.3 | 34.1 | 44.3 | 63.3 |
| Fan Static Head | 1.6 | 1.6 | 1.6 | 1.6 |
| Fan Efficiency | 75 | 75 | 75 | 75 |

Output

| | | | | |
|---|---|---|---|---|
| Tower - Dew Point Eff | 92% | 92% | 92% | 92% |
| # Transfer Units | 5.1 | 5 | 5.1 | 5.1 |
| Cooling Tower Output Temp | 68.3 | 68.3 | 68.3 | 68.3 |
| Temp Rise (Thot - Tcold) | 31.7 | 21.7 | 16.7 | 11.7 |

TABLE IX-continued

90 Percent Dew Point Efficient HX 2 F. approach Tower

| | | | | |
|---|---|---|---|---|
| Water Evap Rate (gpm) | 0.53 | 0.53 | 0.53 | 0.53 |
| Exit Air Temp Sat (F.) | 82.9 | 79.8 | 78.35 | 76.3 |
| Heat Rejected (BTU/hr) | 369,300 | 369,980 | 369,900 | 370,300 |
| Dry Air Flow (#/hr) | 23,300 | 29,912 | 34,077 | 42,200 |
| Enthalpy Air In | 30.96 | 30.97 | 30.97 | 30.97 |
| Enthalpy Air out | 46.8 | 43.3 | 41.82 | 39.74 |
| Specific Vol Exit Air (cf/lb) | 14.2 | 14.07 | 14.02 | 13.93 |
| Sat exit air flow (cfm) | 5,518 | 7,017 | 7,959 | 9797 |
| Approx Fan (hp) | 1.850 | 2.360 | 2.67 | 3.3 |
| Approx Pump (hp) | 0.280 | 0.410 | 0.53 | 0.76 |

TABLE X

90% Cooling Tower Air Inlet Plate Hx Design Parameters*

| Terminal Conditions | 100 F. Case | 90 F. Case | 85 F. Case | 80 F. Case |
|---|---|---|---|---|
| Air Flow #/hr | 23,300 | 29,912 | 34,077 | 42,200 |
| Air Flow cfm | 5,571 | 6,746 | 7,654 | 9,441 |
| Air Dry Bulb In | 105 | 105 | 105 | 105 |
| Air enthalpy in | 39.9 | 39.9 | 39.9 | 39.9 |
| Air Dry Bulb Out | 69 | 69 | 69 | 69 |
| Air enthalpy out | 31.0 | 31.0 | 31.0 | 31.0 |
| Heat Load Q | 208,209 | 267,294 | 304,512 | 377,099 |
| % of Tower Base load | 56% | 72% | 82% | 102% |
| Face Area @ 1500 fpm | 5.0 | 6.0 | 6.8 | 8.4 |
| #/sec - sq ft | 1.7 | 1.8 | 1.9 | 1.9 |
| U heat transfer coeff | 10.0 | 10.0 | 10.0 | 10.0 |
| H2O inlet temp | 68.3 | 68.3 | 68.3 | 68.3 |
| H2O outlet temp | 100.0 | 90.0 | 85.0 | 80.0 |
| Water flow #/hr | 6,940 | 8,910 | 10,150 | 12,570 |
| Water flow gpm | 13.9 | 17.8 | 20.3 | 25.1 |
| LMTD | 2.2 | 4.7 | 5.8 | 6.8 |
| Area sq ft | 9,529 | 5,733 | 5,293 | 5,553 |
| Plate height | 1.0 | 2.0 | 2.0 | 2.0 |
| Plate length | 5.0 | 3.0 | 3.0 | 4.0 |
| Area per Plate | 5 | 6 | 6 | 8 |
| # plates | 1,906 | 956 | 882 | 694 |
| plate line length (in) | 953 | 478 | 441 | 347 |
| Hx length (ft) | 79.41 | 39.81 | 36.76 | 28.92 |
| gpm per plate | 0.007 | 0.019 | 0.023 | 0.036 |

Having described my invention in such terms as to enable those skilled in the art to understand and practice it, and having identified the presently preferred embodiments thereof, I claim:

1. A method of designing a cooling tower to cool water to a temperature less than the ambient wet bulb temperature, the cooling tower including a housing, said method comprising the steps of:

a) establishing a process flow diagram by connecting and establishing air side and liquid side process relationships of components in the cooling tower including the process to be cooled by the cooling tower, wherein the components include the cooling tower, a cooling, tower inlet air to water heat exchanger, and the associated pumps, valves, instrumentation, and controls;

b) further establishing the design ambient conditions (dry bulb, wet bulb, and dew point temperatures);

c) identifying the process heat load (BTU/hr) to be rejected by the cooling tower and the upper limit for the coolant return temperature;

d) conducting a preliminary sizing for the cooling tower using the subject process heat load with a 2 degree approach temperature and a 0.5 l/g ratio;

e) using the ambient air temperature and the upper limit for the coolant return temperature to determine whether the air to water heat exchanger coolant is to be cooled in the cooling tower or in a separate tower or cell as a function of the cooling tower size and air flow, and inlet air heat exchanger coolant return temperatures and wherein the maximum return temperature being limited to less than 30 degrees of the design ambient dry bulb temperature may suggest the use of a separate cell to cool the inlet air heat exchanger;

f) establishing a rough cut for the air to water heat exchanger air flow and heat load using the ambient conditions and preliminary cooling tower sizing information;

g) developing a preliminary heat transfer surface area sizing for the cooling tower air inlet heat exchanger;

h) determining the post sensible cooling air outlet dry bulb and wet bulb conditions for the cooling tower inlet air heat exchanger;

i) further determining the approach temperature for the cooling tower and the approach temperature for the inlet air heat exchanger such that the sum of these approach temperatures is equal to the difference between the dry bulb and wet bulb temperatures of the air entering the cooling tower;

j) sizing the heat exchanger to produce sensibly cooled air having the desired dry bulb temperature;

k) using the sizing data and associated performance information produced; and l) optimizing the cooling tower size and parameters along with the cooling tower inlet air heat exchanger in an iterative manner to arrive at performance parameters that will produce sufficient coolant to cool the cooling tower inlet air heat exchanger and produce the designed cooling tower performance.

2. The method as set forth in claim 1 wherein the heat exchanger comprises an adhesively bonded plate gas-to-liquid heat exchanger having a plurality of spaced apart hollow heat transfer units, each unit including a pair of spaced apart metal plates adjoined by adhesive polymer strips to form the boundaries of a multi-pass channel intermediate the pair of plates for a pressurized liquid to flow through the channel to transfer heat through the plates and between the liquid and a gas flowing intermediate the spaced apart units.

* * * * *